United States Patent [19]
Kelly

[11] Patent Number: 5,999,965
[45] Date of Patent: Dec. 7, 1999

[54] AUTOMATIC CALL DISTRIBUTION SERVER FOR COMPUTER TELEPHONY COMMUNICATIONS

[75] Inventor: Keith C. Kelly, Deerfield Beach, Fla.

[73] Assignee: NetSpeak Corporation, Boca Raton, Fla.

[21] Appl. No.: 08/914,714

[22] Filed: Aug. 19, 1997

Related U.S. Application Data

[60] Provisional application No. 60/024,234, Aug. 20, 1996.

[51] Int. Cl.[6] .................................................. G06F 13/00
[52] U.S. Cl. ............................................................ 709/202
[58] Field of Search ...................... 364/DIG. 1 MS File, 364/DIG. 2 MS File; 709/200, 201, 202, 218, 219, 220, 226, 229, 231, 232, 238

[56] References Cited

U.S. PATENT DOCUMENTS 5,546,452  8/1996  Andrews et al. ........................ 379/219
5,848,143  12/1998  Andrews et al. ........................ 379/219

*Primary Examiner*—Robert B. Harrell
*Attorney, Agent, or Firm*—Kudirka & Jobse, LLP

[57] ABSTRACT

An automatic call distribution system capable of receiving incoming calls originating on either circuit-switched or packet-switched networks utilizes an automatic call distribution (ACD) server for receiving and routing incoming calls and a control center module for dynamically configuring a plurality of agent processes to which the incoming calls may be transferred. The agent processes, control center and ACD server may be separated geographically, but operatively coupled via a computer network. The incoming calls contain user information which enables calls to be routed by the ACD server according to a plurality of different criteria. A graphic user interface enables a system user to dynamically monitor the status of agent processes and reconfigure both queues and the agent processes associated with a queue in response to call loads and agent resource availability.

3 Claims, 14 Drawing Sheets

AUTOMATIC CALL DISTRIBUTION SERVER FOR COMPUTER TELEPHONY COMMUNICATIONS

RELATED APPLICATIONS

This application claims priority to United States Provisional Patent Application 60/024,234 entitled WebPhone Automatic Call Distribution Server by Keith C. Kelly, filed Aug. 20, 1996.

In addition, the subject matters of the following related copending applications are incorporated herein by reference:

U.S. patent application Ser. No. 08/533,115 entitled Point-to-Point Internet Protocol, by Glenn W. Hutton, filed Sep. 25, 1995, now abandoned;

U.S. patent application Ser. No. 08/719,894, entitled Directory Server For Providing Dynamically Assigned Network Protocol Addresses, by Mattaway et al., filed Sep. 25, 1996;

U.S. patent application Ser. No. 08/721,316, entitled Graphic User Interface For Internet Telephony Application, by Mattaway et al., filed Sep. 25, 1996;

U.S. patent application Ser. No. 08/719,891, entitled Method And Apparatus For Distribution And Presentation Of Multimedia Data Over A Computer Network, by Mattaway et al., filed Sep. 25, 1996;

U.S. patent application Ser. No. 08/719,554, entitled Point-to-point Computer Network Communication Utility Utilizing Dynamically Assigned Network Protocol Addresses, by Mattaway et al., filed Sep. 25, 1996;

U.S. patent application Ser. No. 08/719,640, entitled Method And Apparatus For Dynamically Defining Data Communication Utilities, by Mattaway et al., filed Sep. 25, 1996;

U.S. patent application Ser. No. 08/719,898, entitled Method And Apparatus For Providing Caller Identification Based Out-going Messages In A Computer Telephony Environment, by Mattaway et al., filed Sep. 25, 1996;

U.S. patent application Ser. No. 08/718,911, entitled Method And Apparatus For Providing Caller Identification Based Call Blocking In A Computer Telephony Environment, by Mattaway et al., filed Sep. 25, 1996;

U.S. patent application Ser. No. 08/719,639, entitled Method And Apparatus For Providing Caller Identification Responses In A Computer Telephony Environment, by Mattaway et al., filed Sep. 25, 1996; and U.S. patent application Ser. No. 08/832,746, entitled Virtual Circuit Switching Architecture, by Mattaway et al., filed Apr. 4, 1997;

U.S. patent application Ser. No. 08/911,133, entitled Method and Apparatus for Establishing Communications Between Packet-Switched and Circuit-Switched Networks, by Keith C. Kelly, filed Aug. 14, 1997; and U.S. patent application Ser. No. 08/911,519, entitled Domain Name Server Architecture for Translating Telephone Number Domain Names into Network Protocol Addresses, by Keith C. Kelly, filed August 14, 1997.

FIELD OF THE INVENTION

The invention relates, generally, to data processing systems and telecommunication systems, and, more specifically, to a technique for distributing communications from both circuit-switched networks and packet-switched networks to virtual call centers.

BACKGROUND OF THE INVENTION

Two fundamentally different switching technologies exist that enable digital communications. The first type, circuit-switched networks, operate by establishing a dedicated connection or circuit between two points, similar to public switched telephone networks(PSTN). A telephone call causes a circuit to be established from the originating phone through the local switching office across trunk lines, to a remote switching office and finally to the intended destination telephone. While such circuit is in place, the call is guaranteed a data path for digitized or analog voice signals regardless of other network activity. The second type packet-switched networks, typically connect computers and establish an asynchronous "virtual" channel between two points. In a packet-switched network, data, such as a voice signal, is divided into small pieces called packets which are then multiplexed onto high capacity connections for transmission. Network hardware delivers packets to specific destinations where the packets are reassembled into the original data set. With packet-switched networks, multiple communications among different computers can proceed concurrently with the network connections shared by different pairs of computers concurrently communicating. Packet-switched networks are, however, sensitive to network capacity. If the network becomes overloaded, there is no guarantee that data will be timely delivered. Despite this drawback, packet-switched networks have become quite popular, particularly as part of the Internet and Intranets, due to their cost effectiveness and performance.

In a packet-switched data network one or more common network protocols hide the technological differences between individual portions of the network, making interconnection between portions of the network independent of the underlying hardware and/or software. A popular network protocol, the Transmission Control Protocol/Internet Protocol (TCP/IP) is utilized by the Internet and Intranets>Intranets are private networks such as Local Area Networks (LANs) and Wide Area Networks (WAN). The TCP/IP protocol utilizes universal addressing as well as a software protocol to map the universal addresses into low level machine addresses. For purposes of this discussion, networks which adhere to the TCP/IP protocol will be referred to hereinafter "IP-based" or as utilizing "IP addresses" or "Internet Protocol address".

It is desirable for communications originating from a PSTN network to terminate at equipment in an IP-based network. Problems arise, however, when a user on a circuit-switched network tries to establish a communication link to a packet-switched data network, and vice versa, due to the disparity in addressing techniques among other differences used by the two types of networks. Accordingly, many of the services currently available on network are typically not available to communications originating on the other network.

Automatic call distribution (ACD) centers are one such service which has been used successfully on traditional circuit-switched networks. Typically, a number of human operators or "agents" are used to operate telephones or other terminating apparatus to answer incoming calls for a business entity. Such automatic call centers typically are used by companies which service large numbers of incoming calls for sales, support and customer ordering, etc. Generally, a traditional call center consists of routing and switching hardware and a plurality of terminating equipment located on the same PBX.

With the advent of Internet telephony, the ability to receive incoming communications originating from packet-switched data processing networks, such as the Internet, has given rise for the need to 1) set up similar call distribution facilities for packet-switched calls, 2) adapt existing call distribution technology to computer telephony and, 3) create automatic call distribution centers which are capable of accepting calls originating from both circuit-switched networks and packet-switched networks.

Further, the success and efficiency of prior automatic call distribution centers to handle the incoming call load is related to the ability to efficiently route incoming communications. As operator reserves change, e.g. shifts change, operators service calls, operator absenteeism, the performance of the system changes dynamically. As such, the physical configuration of the automatic call distribution hardware, and the proximity of the operators and supervisors to operate the hardware, has placed limitations on the flexibility and, therefore, the efficiency with which traditional circuit-switched automatic call distribution systems perform.

Accordingly, a need exists for a system which is capable of implementing traditional automatic call distribution services for communications originating over packet-switched networks.

A further need exists for an automatic call distribution system which is capable of receiving incoming communications from both a packet-switched network and traditional circuit-switched networks.

In addition, a need exists for an automatic call distribution system in which agent operators and/or supervisors may be located in geographically different locations or over different network topologies while still appearing as a single virtual entity.

Yet another need exists for the ability to automatically queue incoming communications based on a number or criteria without requiring user input.

Still a further need exists for the ability to dynamically reorganize the virtual organization of agents within an automatic call distribution system to effectively deal with dynamic call loads and agent resources, etc.

SUMMARY OF THE INVENTION

The Automatic Call Distribution (ACD) server of the present invention provides automatic routing services for calls from both circuit-switched communication networks, such as PSTNs via gateway exchanges, and packet-switched data networks such as the Internet and Intranets. The ACD server allows small businesses and large corporations alike to configure call center agents into virtual groups, departments or support centers and then route incoming communications based on a number of criteria including Caller ID, DNIS, ANI, PBX trunk numbers, first in-first out, longest call on hold, etc. The ACD server of the present invention collects call information and statistics, both incoming and outgoing, and allows call center management to efficiently manage and respond to changes in call load, employee dynamics, employee performance, etc. Call center agents may be physically located in geographically separate locations worldwide and still appear as a single group. Whether operators are working from the home or distant continents, a corporation's sales, marketing, or support department can be reached by the same call and without additional expense. The ACD server of the present invention further provides a graphic user interface that displays 'at a glance' agent load, agent distribution, and call holding queue status enabling center management to drag and drop call center agents between centers, reroute calls to alternate support centers, or enlist the services of agents who can work from home.

According to a first aspect of the present invention, in an automatic call distribution system, a method of distributing incoming communications over a packet-switched data network, comprises the steps of determining the online status of at least one agent process, defining at least one queue into which incoming communications over the packet-switched network may be placed, each incoming communication containing user information identifying the process from which the communication originated, selectively associating agent processes with the queue in accordance with predetermined criteria, selectively assigning incoming communications to one of the queues in accordance with predetermined criteria, and selectively transferring an incoming communication from the queue to one of the agent processes associated with the queue.

According to a second aspect of the present invention, a computer program product for use with a computer system comprises a computer usable medium having program code embodied in the medium for distributing communications to one or more agent processes, the program code comprising program code means configured to determine at least one agent process operatively coupled to the computer system, program code for defining within the computer system memory a queue, the queue having a plurality of entries, each capable of retaining information associated with an incoming communication, program code, responsive to the agent processes currently online, for enabling association of agent processes with the queue in accordance with a predetermined criteria, program code, responsive to incoming communications, selectively associating an incoming communication with the queue in memory, and program code, responsive to the incoming communications retained in queue and the association of agent processes with the queue, for selectively transferring an incoming communication to an agent process associated with the queue in which the incoming communication information resides.

According to a third aspect of the present invention, an automatic call distribution system for use with a packet-switched data network comprises an automatic call distribution server operatively coupled to the network, a plurality of agent processes operatively coupled to the network, and a control center process operatively coupled to the automatic call distribution server. The automatic call distribution server maintains in a memory thereof a list containing information associated with selected of the agent processes and a list containing information associated with incoming communications. The control center further comprises a graphic user interface for visually displaying and modifying the lists contained within the automatic call distribution server.

BRIEF DESCRIPTION OF THE DRAWINGS

The above and other features, objects, and advantages of the invention will be better understood by referring to the following description in conjunction with the accompanying drawing in which.

DETAILED DESCRIPTION

Figure 1:
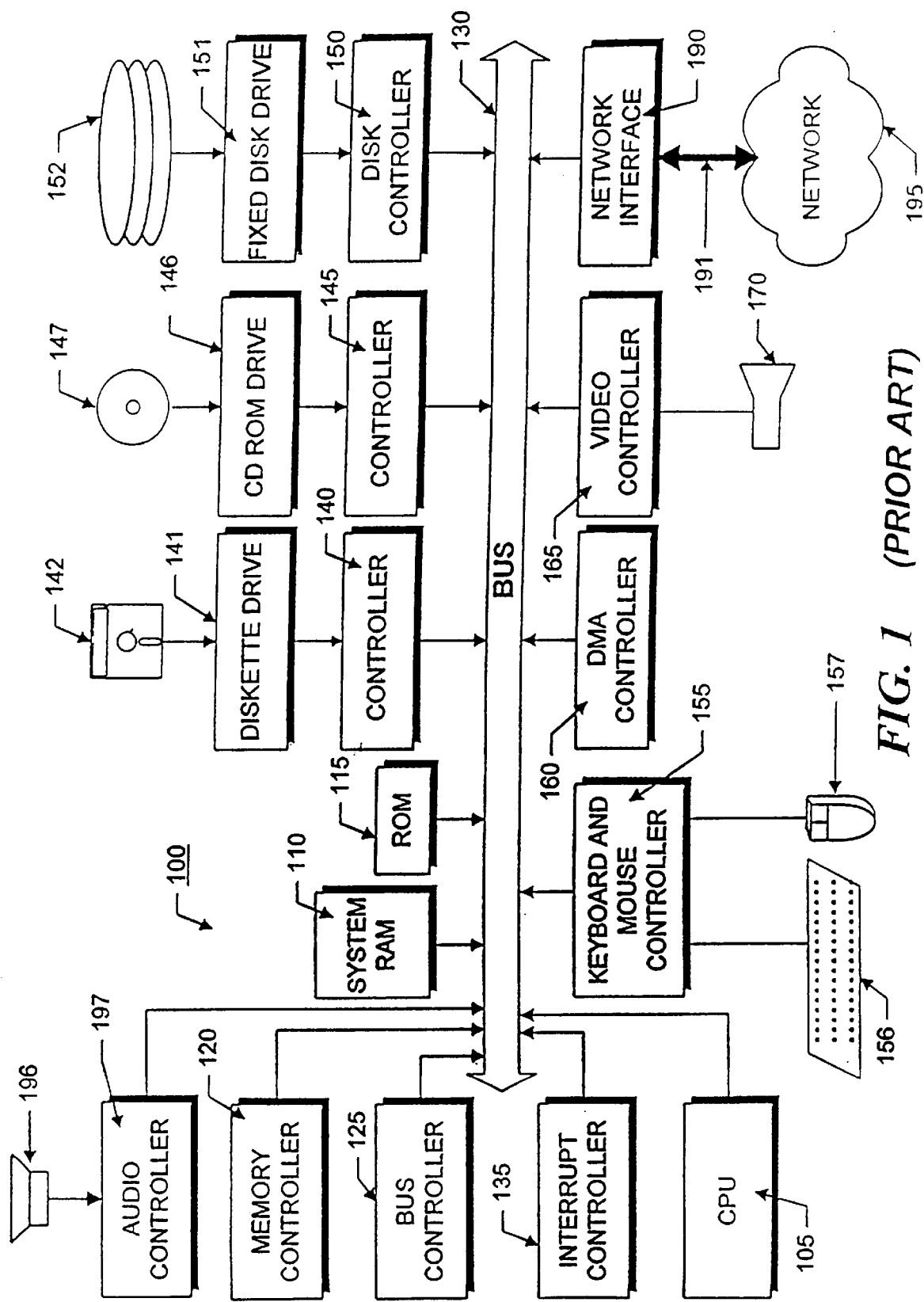
FIG. 1 is a block diagram of a computer systems suitable for use with the present invention.

FIG. 1 illustrates the system architecture for a computer system 100, such as an IBM PS/2® computer on which the invention can be implemented. The exemplary computer system of FIG. 1 is for descriptive purposes only. Although the description below may refer to terms commonly used in describing particular computer systems, such as an IBM PS/2 computer, the description and concepts equally apply to other systems, including systems having architectures dissimilar to FIG. 1.

The computer system 100 includes a central processing unit (CPU) 105, which may include a conventional microprocessor, a random access memory (RAM) 110 for temporary storage of information, and a read only memory (ROM) 115 for permanent storage of information. A memory controller 120 is provided for controlling system RAM 110. A bus controller 125 is provided for controlling bus 130, and an interrupt controller 135 is used for receiving and processing various interrupt signals from the other system components. Mass storage may be provided by diskette 142, CD ROM 147 or hard drive 152. Data and software may be exchanged with computer system 100 via removable media such as diskette 142 and CD ROM 147. Diskette 142 is insertable into diskette drive 141 which is, in turn, connected to bus 130 by a controller 140. Similarly, CD ROM 147 is insertable into CD ROM drive 146 which is connected to bus 130 by controller 145. Hard disk 152 is part of a fixed disk drive 151 which is connected to bus 130 by controller 150.

User input to computer system 100 may be provided by a number of devices. For example, a keyboard 156 and mouse 157 are connected to bus 130 by controller 155. An audio transducer 196, which may act as both a microphone and a speaker, is connected to bus 130 by audio controller 197, as illustrated. It will be obvious to those reasonably skilled in the art that other input devices such as a pen and/or tablet and a microphone for voice input may be connected to computer system 100 through bus 130 and an appropriate controller/software. DNA controller 160 is provided for performing direct memory access to system RAM 110. A visual display is generated by video controller 165 which controls video display 170. Computer system 100 also includes a communications adaptor 190 which allows the system to be interconnected to a local area network (LAN) or a wide area network (WAN), schematically illustrated by bus 191 and network 195.

Computer system 100 is generally controlled and coordinated by operating system software, such the OS/2® operating system, available from International Business Machines Corporation, Armonk, N.Y. or Windows NT operating system, available from Microsoft Corporation, Redmond, Wash. The operating system controls allocation of system resources and performs tasks such as process scheduling, memory management, and networking and I/O services, among other things. The present invention is intended for use with a multitasking operating system, such as those described above which are capable of simultaneous multiple threads of execution. For purposes of this disclosure a thread can be thought of as a "program" having an instruction or sequence of instructions and a program counter dedicated to the thread. An operating system capable of executing multiple threads simultaneously, therefore, is capable of performing multiple programs simultaneously.

In the illustrative embodiment, an automatic call distribution server in accordance with the present invention is implemented using object-oriented technology and an operating system which supports an execution of an object-oriented programs. For example, the inventive ACD server may be implemented using the C++ language or as well as other object-oriented standards, including the COM specification and OLE 2.0 specification for MicroSoft Corporation, Redmond, Wash., or, the Java programming environment from Sun Microsystems, Redwood, Calif.

Telecommunication Environment

FIG. 2 illustrates a telecommunications environment in which the invention may be practiced such environment being for exemplary purposes only and not to be considered limiting. Network 200 of FIG. 2 illustrates a hybrid telecommunication environment including both a traditional public switched telephone network as well as Internet and Intranet networks and apparatus bridging between the two. The elements illustrated in FIG. 2 are to facilitate an understanding of the invention. Not every element illustrated in FIG. 2 or described herein is necessary for the implementation or the operation of the invention.

A pair of PSTN central offices 210A-B serve to operatively couple various terminating apparatus through either a circuit switched network or a packet switched network. Specifically, central offices 210A-B are interconnected by a toll network 260. Toll network 260 may be implemented as a traditional PSTN network including all of the physical elements including routers, trunk lines, fiber optic cables, etc. Connected to central office 210A is a traditional telephone terminating apparatus 214 and an Internet telephone 232A. Terminating apparatus 214 may be implemented with either a digital or analog telephone or any other apparatus capable of receiving a call such as modems, facsimile machines, etc., such apparatus being referred to collectively hereinafter as a terminating apparatus, whether the network actually terminates. Further, the PSTN network may be implemented as either an integrated services digital network (ISDN) or a plain old telephone service (POTS) network. The Internet telephony is conceptually illustrated as a telephone icon symbolizing the Internet telephone client application executing on a personal computer and interconnected to central office 210A via a modem 270A. Similarly, telephone 214C is connected to central office 210D and WebPhone 232C is connected to central office 210B via modem 270C. Central offices 210A-B are, in turn, operatively coupled to Internet 220 by ISP 250B and 250C, respectively. In addition, central office 210A is coupled to ISP250B by gateway 218B. Similarly, central office 210B is connected to ISP 250C by gateway 218C. In addition, a telephone 214B and Internet telephone 232B, similar to telephone 214A and Internet telephone 232A, respectively, are interconnected to Internet 220 via PBX 212, gateway 218A and ISP 258A. In addition, global server 252 is coupled to the Internet 220 are a domain name system server 254 and 255. Global server 252 may be implemented as described in U.S. patent application Ser. No. 08/719,894, entitled Directory Server for Providing Dynamically Assigned Network Protocol Addresses, previously referenced and incorporated herein. A global server suitable for use as Global Server 252 is commercially available from NetSpeak Corporation in the form of a collection of intelligent software modules including connection server Part No. CSR1, information server, Model ISR1, and database server, Model DBSR1. Name servers 254 and 255 are described as set forth hereinafter. Finally, Internet Service Providers (ISPs) 250A–D may comprise any number of currently commercially available Internet service providers such as America On Line, the IBM Global Network, etc. An Intranet implemented as LAN 275 is coupled to Internet 220 via ISP 250D and server 256. Server 256 may have the architecture as illustrated in FIG. 1 and functions as a proxy server for LAN 275 to which WebPhone 232E is connected via a LAN-based TCP/IP network connector 280. A plurality of Internet telephone 232F and 232E are coupled to LAN 275 via LAN connectors 280. The gateways and Internet telephony client applications may be implemented as set forth in greater detail hereinafter.

WebPhone Client

Internet telephone 232 may be implemented as described in the previously referenced U.S. patent applications incorporated herein by reference. An Internet telephony application suitable for use with the present invention is the WebPhone 1.0, 2.0 or 3.0, client software application commercially available from NetSpeak Corporation, Boca Raton, Fla., referred to hereafter as the WebPhone client. For the remainder of this description, the Internet telephone will be referred to as the WebPhone client. It will be obvious to those reasonably skilled in the arts that other Internet telephone applications implementing similar functionality may be substituted for the WebPhone without affecting the inventive concepts contained herein. The WebPhone client comprises a collection of intelligent software modules which perform a broad range of Internet telephony functions. For the purpose of this disclosure, a "virtual" WebPhone client refers to the same functionality embodied in the WebPhone client application without a graphic user interface. Such virtual WebPhone client can be embedded into a gateway, automatic call distribution, server, or other apparatus which do not require extensive visual input/output from a user and may interact with any other WebPhone clients or servers adhering to the WebPhone protocol. For the purpose of this disclosure, WebPhone client 232 or any of the virtual WebPhone clients may be implemented in other apparatus, may be considered WebPhone client applications, "WebPhone Clients", as opposed to other apparatus such as the connection/information server, which adheres to the WebPhone Protocol.

The WebPhone software applications may run on the computer system described with reference to FIG. 1, or a similar architecture whether implemented as a personal computer or dedicated server. In such an environment, the sound card 197 accompanying the computer system 100 of FIG. 1, may be an MCI compliant sound card while communication controller 190 may be implemented through either an analog modem 270 or a LAN-based TCP/IP network connector 280 to enable Internet/Intranet connectivity.

The WebPhone clients, as well as any other apparatus having a virtual WebPhone embodied therein, each have their own unique E-mail address and adhere to the WebPhone Protocol and packet definitions, as extensively described in the previously referenced related U.S. patent applications. For the reader's benefit, short summary of a portion of the WebPhone Protocol is set forth to illustrate the interaction of WebPhone clients with each other and the connection/information server when establishing a communication connection.

Each WebPhone client, may serve either as a calling party or a caller party, i.e. the party being called. The calling party transmits an on-line request packet to a connection/information server upon connection to an IP-based network, e.g. the Internet or an Intranet. The on-line request packet contains configuration and settings information, a unique E-mail address and a fixed or dynamically assigned IP address for the WebPhone client. The callee party, also a utilizing a WebPhone client, transmits a similar on-line request packet containing its respective configuration and setting information, E-mail address and IP address to the same or a different connection server upon connection to an IP-based network. The calling party originates a call by locating the callee party in a directory associated with either its own WebPhone client or the connection/information server to which it is connected. The callee party may be identified by alias, E-mail address or key word search criteria. Once the E-mail address of the calling party is identified, the calling party's WebPhone forwards a request packet to the connection/information server, the request packet containing the callee party's E-mail address. The connection/information server uses the E-mail address in the received request packet to locate the last known IP address assigned to the callee party. The connection/information server then transmits to the calling party an information packet containing the IP address of the callee party. Upon receipt of the located IP address from the connection server, the calling party's WebPhone client initiates a direct point-to-point communication link with the callee party by sending a call packet directly to the IP address of the callee party. The callee party either accepts or rejects the call with appropriate response packets. If the call is accepted, a communication session is established directly between the caller and the callee, without intervention of the connection/information server. The above scenario describes establishment of a communication link which originates and terminates with clients on an IP-based network.

To facilitate interaction with WebPhone clients, a virtual WebPhone is implemented in the gateway 218, either executable in RAM memory or embedded in ROM memory associated with such apparatus. The gateway 218 comprises a virtual WebPhone client which acts as a proxy device and voice processing hardware that bridges from an IP-based network to a PSTN network. The gateway 218 may be implemented with either a microprocessor based architecture or with dedicated digital signal processing logic and embedded software. A gateway suitable for use as gateway 218 with the present invention is either NetSpeak Model Nos. WGX-MD/24, a 24-port digital T-1 IP telephony gateway, or WGX-M/16, a 16-port analog IP telephony gateway, both commercially available from NetSpeak Corporation, Boca Raton, Fla. Gateway 218 is described in greater detail with reference to FIG. 3 hereinafter.

One of the capabilities of the gateway 218 is to bridge between the PSTN and Internet/Intranet, and the Internet/Intranet and the PSTN. Gateway 218 virtualizes the PSTN call, making it appear as just another WebPhone client call. This virtual WebPhone process interfaces with ACD server 242 so that incoming PSTN calls can be routed to agent WebPhone processes with the tracking, distribution, and monitoring features of the ACD server 2424, as described hereinafter. For incoming calls originating on a PSTN, gateway 218 provides to ACD server 242 information about incoming calls so that proper call routing can ensue, such information possibly comprising Caller ID (CLID), automatic number identification (ANI), DNIS, PBX trunk information, from the central office 210, or other information collected by voice response units.

Figure 2A:
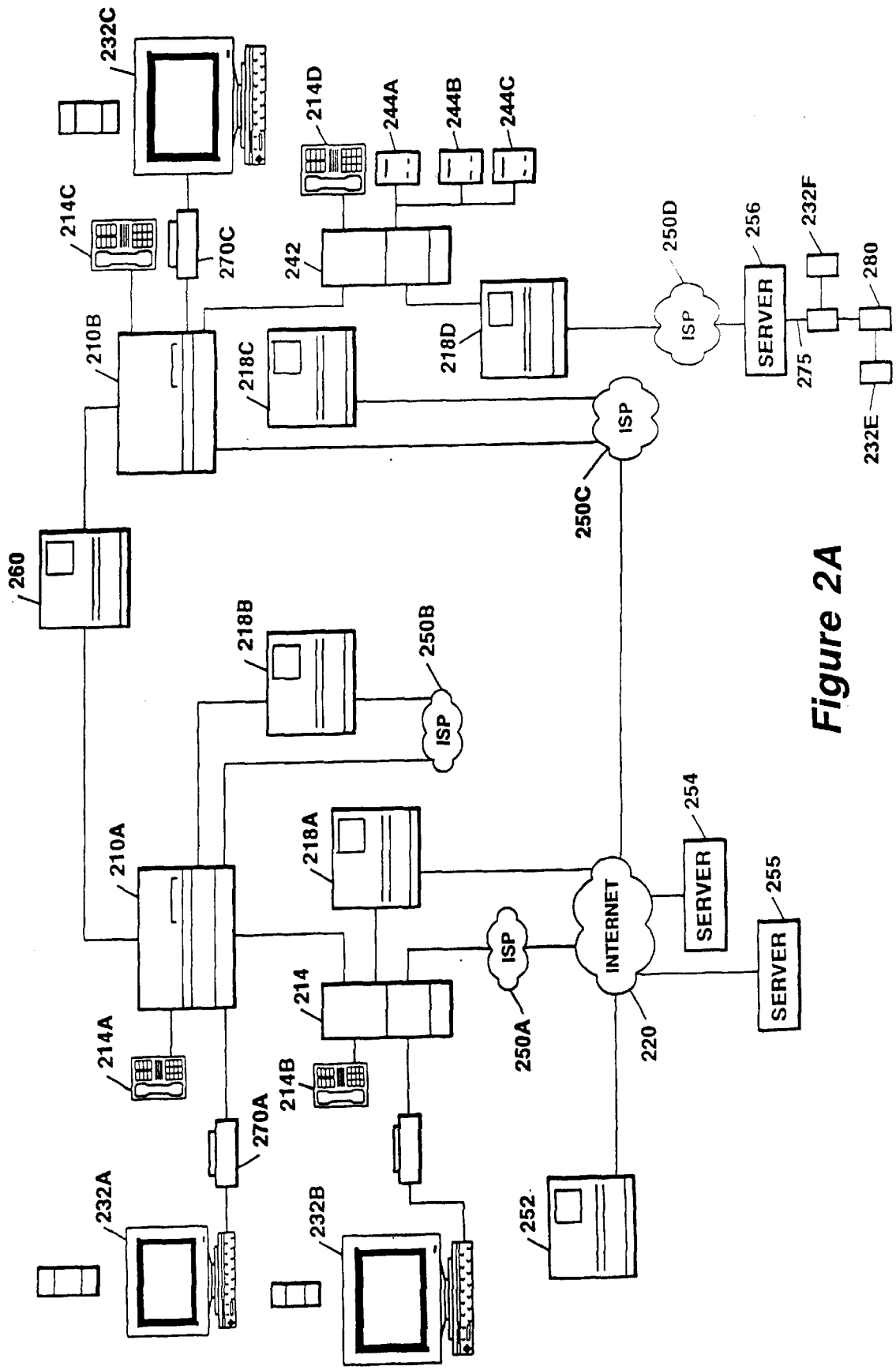
FIG. 2A is a conceptual illustration of a communications network environment in which the present invention may be utilized.

A communication link over a packet-switched network may be established with the network illustrated in FIG. 2A, using the WebPhone protocol as disclosed in U.S. patent application Ser. No. 08/533,115 entitled "POINT-TO-POINT INTERNET PROTOCOL" by Glenn W. Hutton, filed Sep. 25, 1995, previously incorporated herein by reference. Specifically, WebPhone 232A may connect to Internet 220 through central office 210A, ISP 250B and register with global server 252, notifying server 252 of its current dynamically signed Internet protocol address. Subsequently, WebPhone client 232A may inquire as to the current Internet protocol address of another WebPhone client, for example, WebPhone client 232C. If WebPhone client 252 is currently connected to the Internet and has likewise registered with the global server 252 will return the Internet protocol address of WebPhone 232C to WebPhone 232A. WebPhone client 232A may then establish a direct connection to WebPhone client 232C via central office 210A, ISP 250B, Internet 220, ISP 250C, and central office 210B. Alternatively, a point-to-point connection over a packet-switched network may be established over a local area network 275 by means of a direct connection from WebPhone clients 232E to 232F, such connection being possible if the Internet protocol addresses of the respective WebPhones are fixed.

Figure 2B:
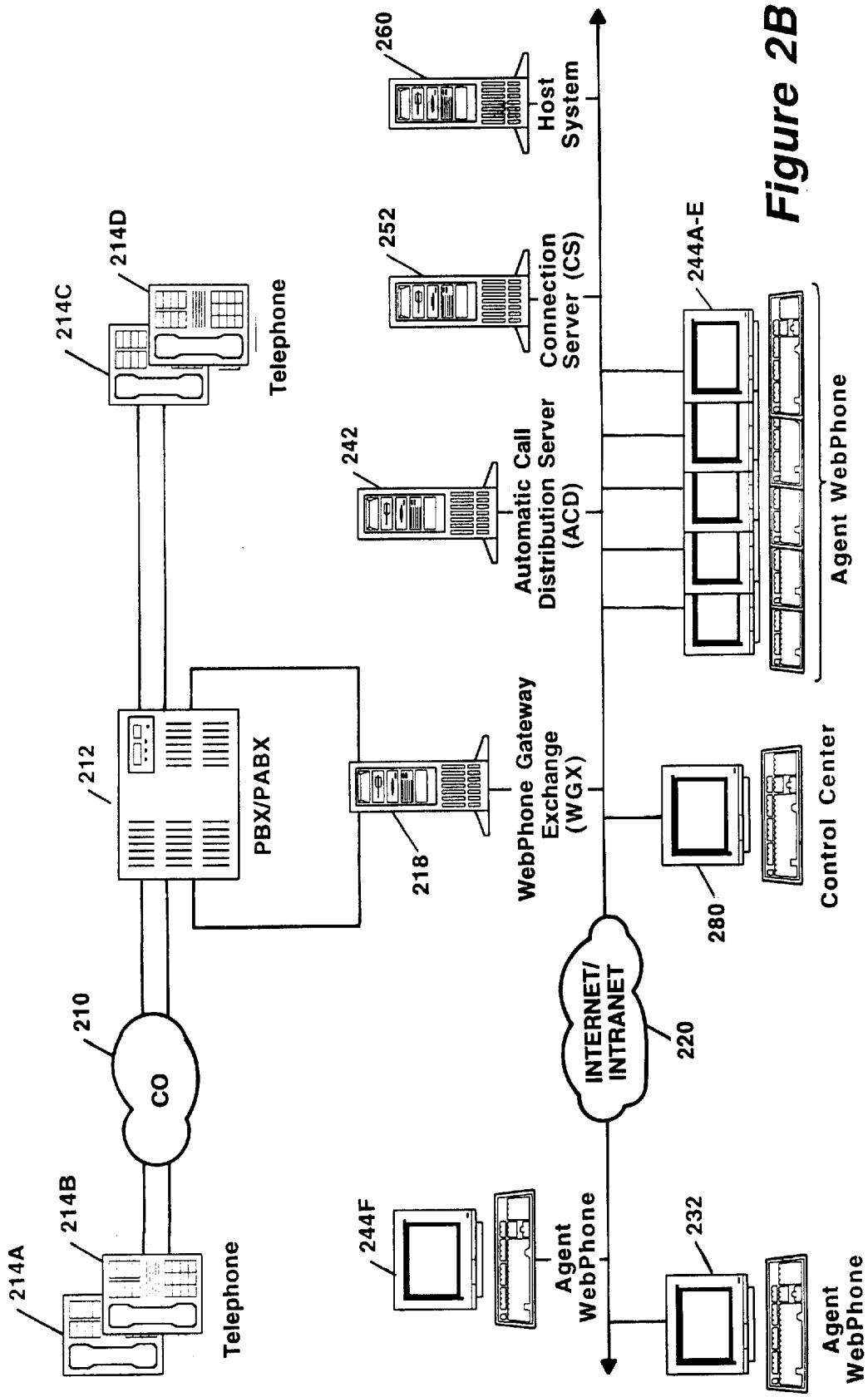
FIG. 2B is a conceptual illustration of a communications network environment in which the present invention may be utilized.

Having explained the telecommunication environment and a number of possible interactions between terminating apparatus on a circuit-switched network and executing tasks on a packet-switched network, a simplified telecommunication environment is illustrated in FIG. 2 to facilitate an understanding of the invention. Where possible, the same reference numbers are utilized in FIG. 2B as in FIG. 2A.

Referring to FIG. 2B, a pair of terminating apparatus 214A-B are coupled to a public switched telephone network central carrier office 210 which is, in turn, coupled to a public branch exchange/public access branch exchange (PBX/PABX) 212, in a manner as previously described with reference to FIG. 2A. A second pair of terminating apparatus, i.e. telephones 214C-D, are connected directly to PBX/PABX 212, as illustrated. PBX/PABA212 is coupled to a gateway 218 which is, in turn, coupled to a packet-switched data network, illustrated as Internet/Intranet 220. Coupled to network 220 are automatic call distribution server 242, a connection server 252, one or more caller WebPhone client processes 232, and one or more agent WebPhone client processes 244A–F. Gateway 218, connection server 252, Internet 220, and WebPhone clients 232 and 244 have the structure and functionality as previously described herein or as referenced in copending application. In addition, a control center 280, host system 260, and conference server 270 are operatively coupled to ACD server 242 over network 220.

Host system 260 may be used in conjunction with the ACD system of the present invention but is not an integral part thereof. Host system 260 typically comprises a server and database on which customer records, such as name address, product registration information, warranty information, etc. are stored. Host system 260 may be coupled to ACD server 242 over a private or a public network. In order for agent processes working from satellite locations to receive, review, and update customer information, ACD server 242 may notify optional host system 260 of a received customer call based on available information, i.e. ANI, CLID, DNIS, etc. Host system 260 then generates an HTML document that may be retrieved by the agent process when the call is routed to the agent. The agent may then review, modify, and upload the HTML data to the host. Alternatively, the host generates an HTML password protected page on a server such as a Web Server. The agent process is sent the URL and password to the Web page. The agent may then access the protected page with a secure browser. The agent may then review, modify, and upload the HTML data.

Figure 8:
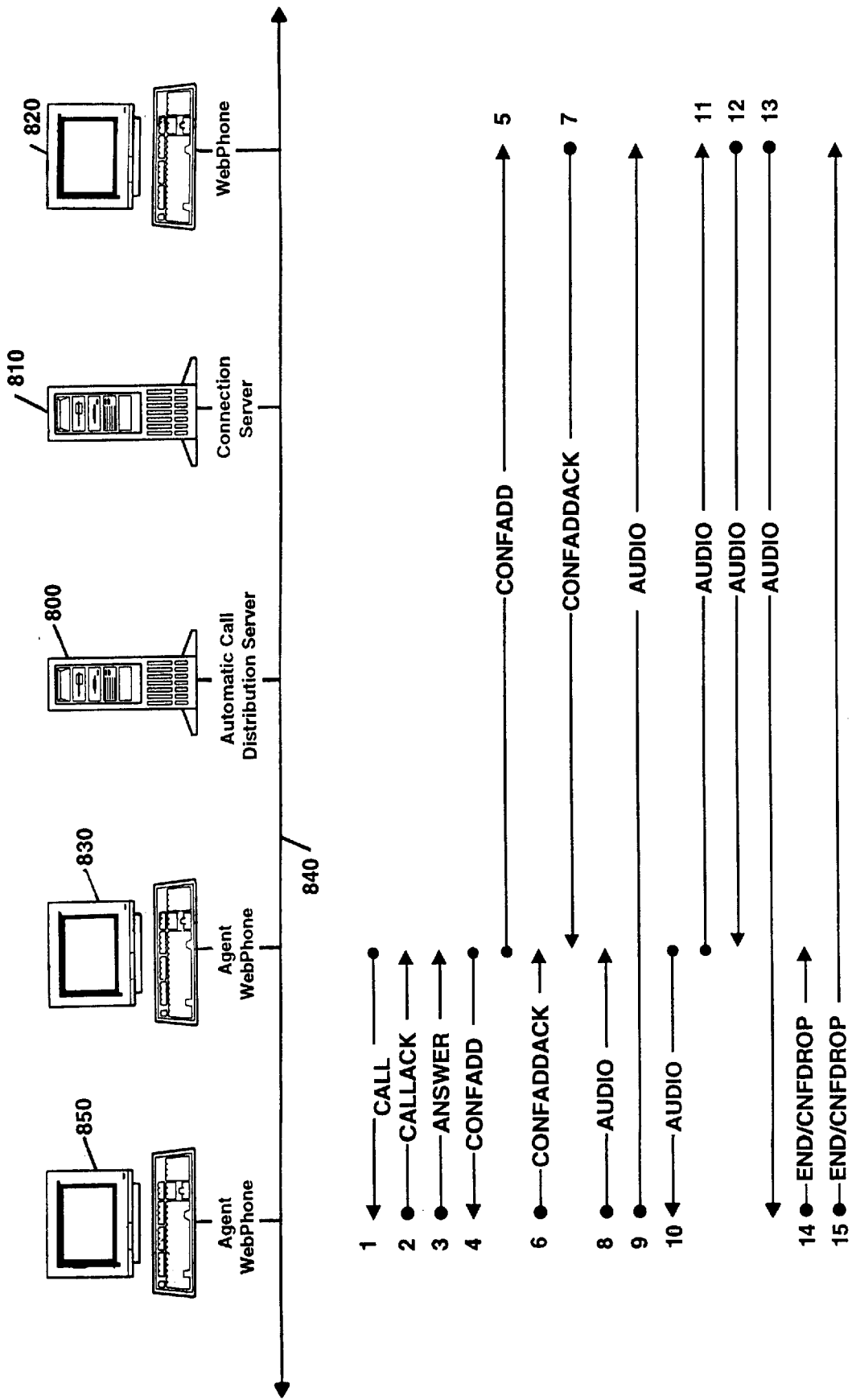
FIG. 8 a schematic block diagrams illustrating a packet transfer sequence in accordance with the communication protocol of the present invention.

Conference server 270 may be used in conjuntion with the ACD system of the present invention but is not an integral part thereof. Conference server 270 typically comprises a server, network interface logic and logic necessary to replicate data, such as AUDIO and/or VIDEO packets, for transmission over a packet-switched network in accordance with the WebPhone protocol. Conference server 270 may be coupled to ACD server 242 over a private or a public network. In the ACD server 300 environment, it is advantageous for agents to call supervisors when situations with customers warrant assistance. After conferencing in a supervisor, agents need the capability to stay on the line until the supervisor drops off, or allow the supervisor to exit from the call and finish call processing themselves. Additionally, supervisors need the ability to call into conversations in progress and monitor agent performance and quality of service. In certain instances, however, a conference server is not required, particularly were the number of parties is small. In such instances the conferencing functionality embodied in the WebPhone protocal, as described with reference to FIG. 8 is suffient.

ACD server 242, control center 280, and agent WebPhone clients collectively function as the ACD system of the present invention. The structure and function of ACD server 242 and control center 280 are described hereinafter with reference to FIGS. 3–11.

Automatic Call Distribution Server Architecture

Figure 3A:
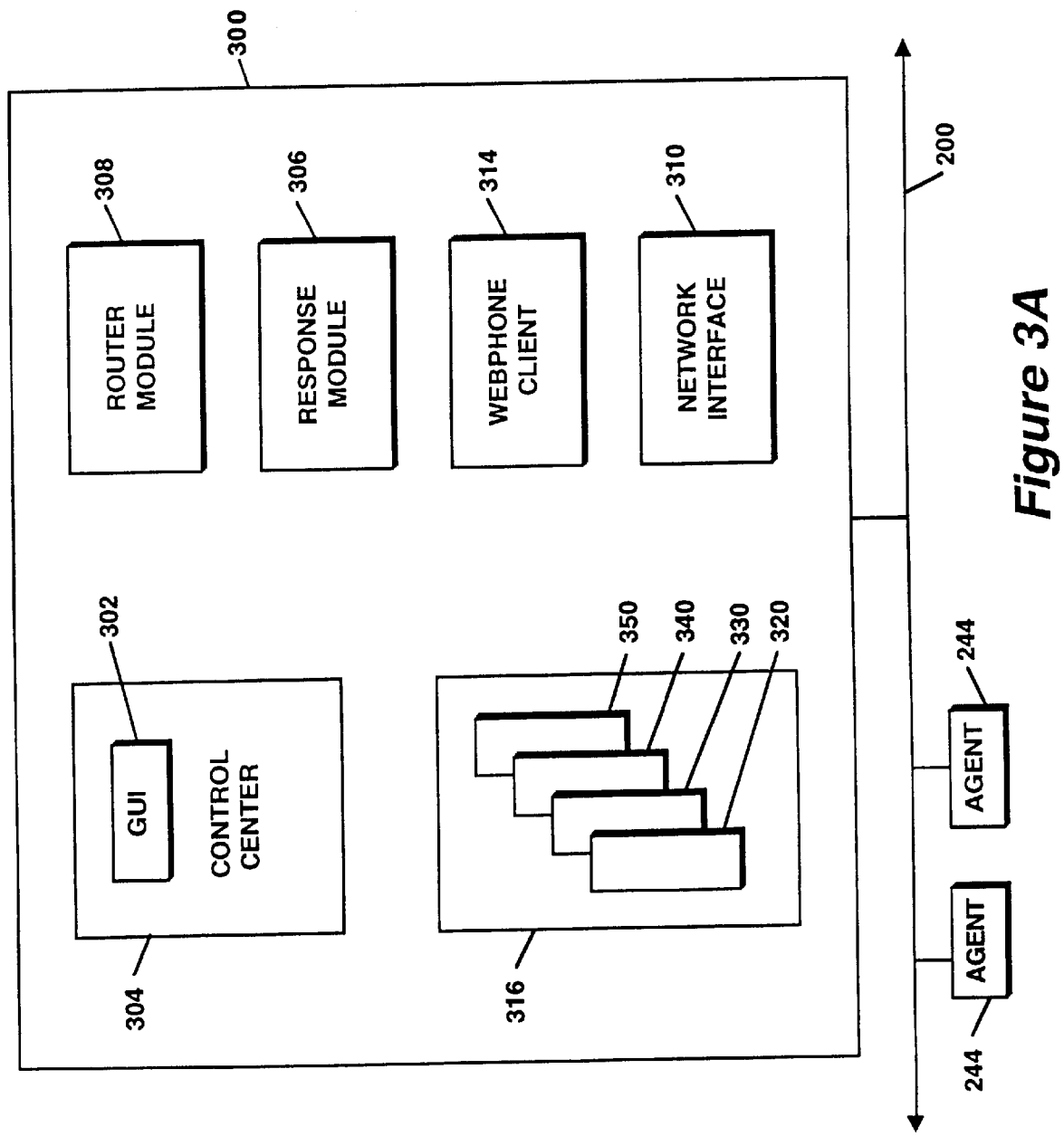
FIG. 3A is a block diagram of an automatic call distribution server system in accordance with the present invention.

FIG. 3A illustrates conceptually the system architecture of ACD Server 300, which may be used as ACD server 242 of FIG. 2B. ACD Server 300 may be implemented using computer architecture similar to computer system 100 as described in FIG. 1 such elements having been described in detail and not shown in FIG. 3. ACD server 300 comprises multiple software modules which collectively enable all facets of call progress and call handling to be controlled by ACD server 300. Specifically, ACD Server 300 comprises a graphic user interface 302, control center module 304, voice response module 306, call routing module 308, network interface 310, WebPhone client 314, a memory 316 and an optional database 312.

As illustrated in FIG. 2B, although agent processes 244 comprise portions of the automatic call distribution system, they may be located remotely from ACD server 300 over either a private or global packet-switched network. Similarly, control center 304 and GUI 302, although illustrated in FIG. 3B as part of ACD server 300 may likewise be located remotely from ACD server 300 over either a private or global packet-switched network. The control center 304, agent WebPhone processes 244 and ACD server 300 with one another using the various packets of the WebPhone protocol, as described herein and in the previously referenced copending applications. In this manner, a virtual automatic call distribution system may comprise a supervisor at a control center and one or more agents all of whom may be located in geographically separate locations, but are connected over a packet-switched data network to the ACD server 300, and collectively appear to an incoming caller as a single virtual entity.

The ACD Server 300 resides logically between the agent WebPhone processes 244 that form the business unit utilizing automatic call distribution, and a global or local connection server 252. ACD server 300 appears as a series of virtual WebPhone processes to connection server 252, one WebPhone process for each group ACD server 300 represents, each with unlimited line capability. Agent processes 244 are configured with the ACD server 300 as their respective connection server, however, ACD server 300 does not actually duplicate the connection server functionality. Instead, ACD server 300 may be configured to invoke the services of connection server 252, as needed. Necessary packets and required information from agent WebPhone 244 are reflected or routed to connection server 252 by ACD server 300 thereby enabling ACD server 300 to perform call tracking and statistics collection, as required.

Control Center Module

Although illustrated in FIG. 3A as part of a CD server 300, control center 304 and graphic user interface 302 may be implemented as a remote module couplable to ACD server 300 over a network. Control center 304 provides a graphic user interface 302 and a plurality of options and dialog boxes through which the control center may send packetized commands to ACD server 300. Specifically, graphic user interface 302 may be implemented using standard Windows APIs to display the previously described tables and queues in tabular or iconic form. In the manner reasonably understood by those skilled in the programming arts, information within the tables and queues may be dragged and dropped using a mouse or other pointer device with graphic user interface 302 to manipulate the contents of the tables. Changes to the tables and/or parameters of the queues are then sent in packetized form to ACD server 300 which appropriately updates the memory 316 or optional database 312. Control center 304 enables the supervisor user to set queue depth, reassign agents to groups or splits, track call progress, etc. A number of packets utilized by control center 304 to communicate commands and data to ACD server 300 are described hereinafter.

In the illustrative embodiment, GUI 302 in control center 304 is designed to allow viewing of a single department at a time. When the Control Center 304 is launched, queries ACD server 300 to supply current status of the department being viewed and subsequently send only "events" that occur within a department. Control center 304 will track the time between these events and update the GUI 302 accordingly. Examples of "events" packets iinitiaited by ACD server 300 upon the occurence of:

New call arrives in queue.
Agent finishes call and hangs up.
Agent Enters Do Not Disturb Mode.
Agent Leaves Do Not Disturb Mode.
Agent Goes Off-line.
Agent Goes Online.
Agent Picks Up Personal Line.
Agent Hangs Up Personal Line.

The control center user may desire to see the agent WebPhone processes per department or only those WebPhone processes ONLINE. Each of the control center initiated packet specifies the options desired.

ACD server 300 further comprises a call response module 306 which functions to provide periodic responses to incoming calls. The construction and function of call response module 306 is similar to that of a regular WebPhone client without a graphic user interface. In addition, one or more prerecorded messages in the form of packetized audio and/or video and text data may be stored in a local memory or within memory 16, or possibly database 312. The call response module transmits messages to incoming calls as determined by the appropriate customer or agent threads, as described herein.

Call Router Module

ACD server 300 further comprises a call router module 308 which receives parameter data from control center 304 and oversees the creation of appropriate threads to route calls effectively. In the illustrative embodiment, a number of different criteria may be utilized to route incoming calls, several such algorithms are described as follows:

Call Control Vectoring (CCV) on Split Basis—Call Control Vectoring allows the user to configure their ACD to route calls to various queues or splits. Each split may be configured with its own call routing algorithms.

CCV based on Queue Depth—Support for CCV based on queue statistics. Queues reaching certain levels of activity or call hold time to Agent on duty ratios result in alternate CCV to other backup call centers, announcements, or backup/alternate agent strategies.

Stranded Call Routing—Calls left on the queue for excessive lengths of time can be automatically routed to receive announcements or special Agents.

CCV based on Assigned Agent Priority—Agents assigned to a particular split can be additionally assigned a priority that influences CCV. A collection of Agents assigned the same priority are routed calls equally. As split depths increase, lower priority agents from other splits, working at remote sites, working from home, etc. can be routed calls as needed to satisfy customer needs.

Language Support/Call Routing—CCV support for call routing based on language requirements.

Time of Day and Week CCV—Alternate CCV based on the time of day or day of week to support automatic load balancing. A call center receiving calls after 5:00 pm EST could be route automatically to PST call centers.

The actual routing algorithms may be implemented a modular routines in memory 316 indexed by indentifiers and specifiable by specific commands from the call center identifying the routine by which calls are to be answered.

Call Router Module 308 of ACD server 300 reroutes packets in the same manner as connection server 252 enabling ACD server 300 to act as a virtual connection server without having to duplicate all of the connection server functionality. ACD server 300 acts as a virtual Web-Phone client for each of the incoming call. Incoming calls may originate from other addresses on a packet-switched network or from terminating apparatus on a circuit-switched network. As an incoming call is received, ACD server 300 may accepts the call conditionally on queue depth and configuration information received from control center 304. For each call, an entry representing the call is placed into one of the queue(s) and two network sockets are opened. One socket functions to transmit audio and/or other data while the other socket functions to transmit control data. The number of sockets, therefore, partially determines the number of incoming calls that may be opened at any instant.

Table and Queue Structures

Figure 3B:
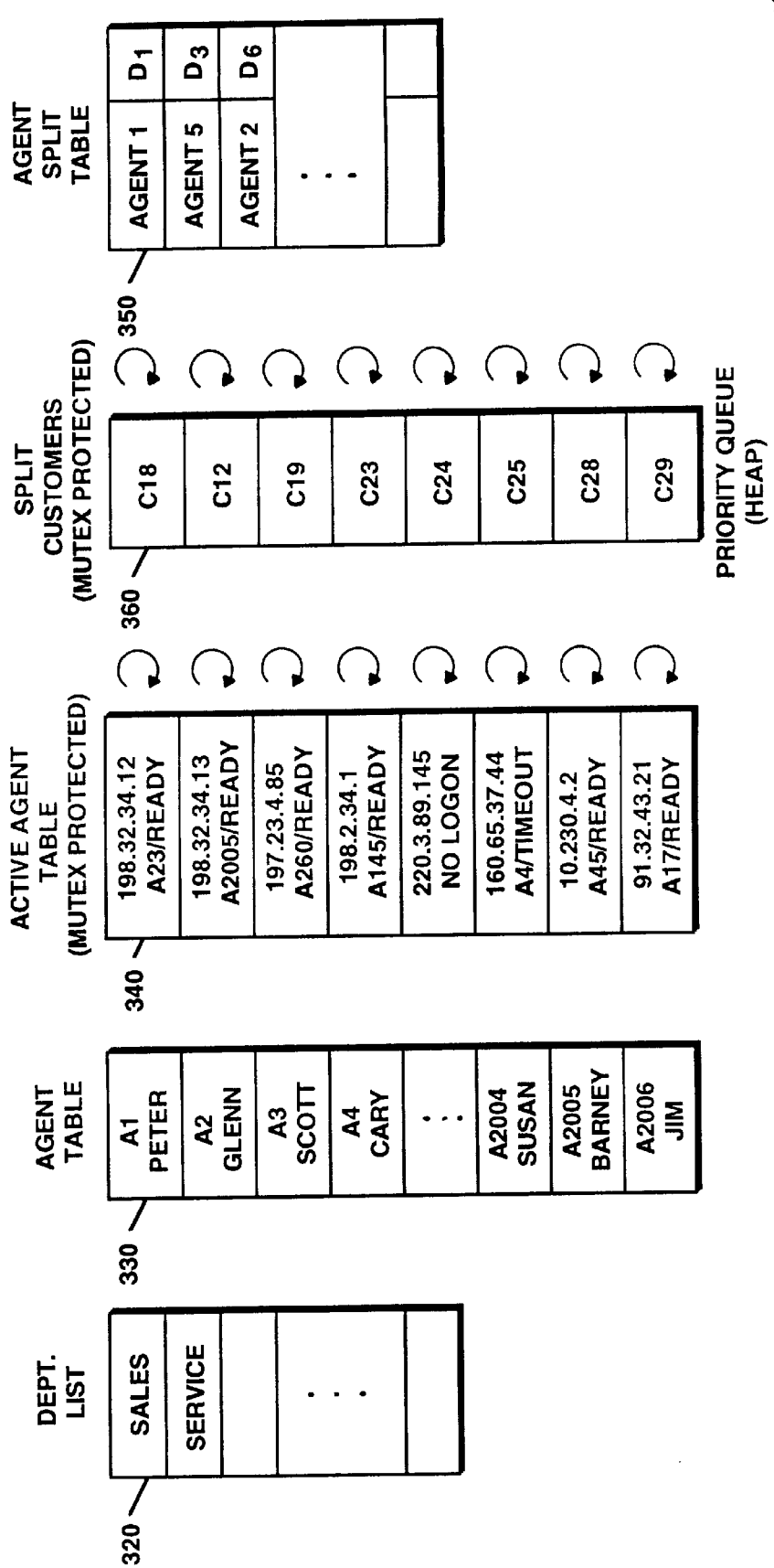
FIG. 3B is a conceptual diagram of the data structures for agent tables and incoming call queues in accordance with the present invention.

ACD server 300, upon initialization, sets up a number of tables and queues necessary for routing and tracking of incoming calls, as illustrated by FIG. 3B. The automatic call distribution system of the present invention is intended to service calls for one or more groups, such as sales and support within a single organization or for multiple organizations. Such groups are referred to hereinafter as splits or queues. The number of splits as well as the agents assigned to a split and the call routing algorithm to be used with calls within a split queue are defined using the control center module 304, as explained herein.

Referring to FIG. 3B, a department list 320 is maintained within memory 316 by ACD server 300. The department list 320 includes information identifying each of the groups or splits for which the ACD currently has responsibility, as defined by the ACD system user, hereinafter referred to as a supervisor. Department list 320 may be implemented as a linked list or a doubly-linked list or, alternatively, may be implemented as a series of records within database 312. The information retained regarding each department may comprise a department identifier, the E-mail address of the department and an Internet protocol address, if a fixed address has been assigned to the department.

ACD server 300 also maintains in memory 316 or in optional database 312 an Agent Information Table 330, as illustrated in FIG. 3B. Each entry of the Agent Information Table includes an agent identifier by which the system may track agents, as well as user information for each agent operator associated with the automatic control distribution system. In the contemplated invention, an agent is a human operator operating WebPhone client software on a computer architecture, such as that illustrated in FIG. 1 and which is operatively coupled to a packet-switched data network to ACD server 300. Each entry of the Agent Information Table 330 may further include supplemental identification data such as that contained in the user information packet of the WebPhone protocol, e.g. agent name, address, E-mail address, etc. Where large numbers of agents are employed in connection with an automatic call distribution system, the Agent Information Table 330 may be implemented as a series of records in database 312 with each agent having one or more records associated therewith. A separate Agent Information Table 330 may be compiled for each entry of department list 320.

An Active Agent Table 340 is utilized by ACD server 300 to continuously monitor the status of agents. Active Agent Table 340 may be implemented as a circular list in memory 316. Each entry of table 340 includes an agent identifier, a status indicator, and the current Internet protocol address assigned to the agent's WebPhone process. In the illustrative embodiment, to prevent simultaneous modification of an entry in a multithreaded environment, either a single entry or the entire table 340 may be accessed only through a mutually exclusive semaphore mechanism, such mechanisms known within the programming arts. In this manner, an agent's status is maintained current. As with tables 320 and 340, the Active Agent Table 340 may be implemented using linked lists within memory 316 or, alternatively, may be implemented using optional database 312.

ACD server 300 further constructs a Split Agent Table 350 whose entries contain information on agents who are actively online and to one or more spilts or groups from which they may receive incoming calls. As with tables 320 and 330, table 350 may be implemented as a linked list or doubly linked list, or, alternatively, may be implemented in optional database 312. The interaction of tables 330, 340 and 350 is described with reference to FIGS. 9–11.

In addition, ACD server 300 constructs a queue 360 for each group for which ACD server 300 has responsibility. Once an incoming call is received by ACD server 300, a call record is created and a thread spawned to manage the record, as described hereinafter. The entries of queue 360 include the call record for the queue. The call record is updated as the call progresses, e.g. messages are played, connection lost, etc. Once a record has progressed to the top of a queue, the call will be assigned to an agent. In addition to maintaining the status of a call, the call record may also include information, such as user information contained within a USERINFO packet identifying the caller. Queue 360 is implemented in memory 316 in the illustrative embodiment as a priority queue data structure. In the illustrative embodiment, such priority queue is not a pure First In First Out (FIFO) queue, but allows each entry to be assigned a priority which causes some entries to be handled prior to their actual position and queue. If all entries in a priority queue were provided with the same priority number, a pure FIFO queue would result. In this manner, certain entries may be taken for others, however, the general protocol is that the oldest calls are serviced first.

ACD Packet Transfer Sequences

In FIGS. 4–8, agent and caller process may be implemented as WebPhone client processes. The network may be any combination of LAN and WAN network technologies, i.e. the Internet or Intranet. Further, the connection server may be connected to the ACD server locally over a private network, i.e. an Intranet or globally over a global network, i.e. the Intranet. The agent process may likewise be connected to the ACD server either globally or locally. Additionally, the caller processes may originate on packet-switched networks as well as circuit-switched networks such as PSTNs using a gateway exchange (not shown). The format and description of the packets referred to with reference to FIGS. 4–8 are described in detail herein as well as with reference to the WebPhone Protocol in the previously referenced copending, related patent applications.

Figure 4:
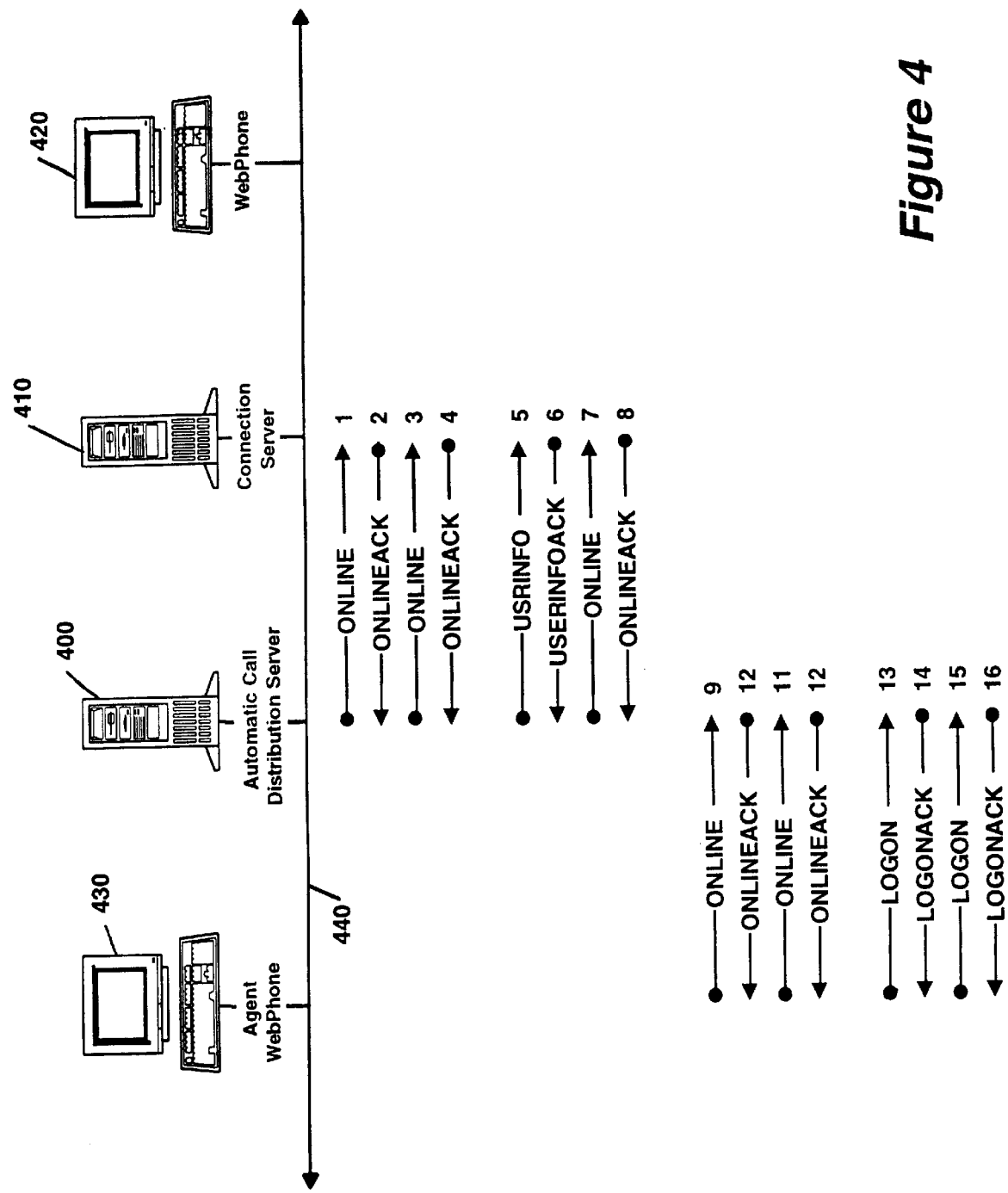
FIG. 4 is a schematic block diagrams illustrating a packet transfer sequence in accordance with the communication protocol of the present invention.

FIG. 4 illustrates schematically the packet transfer sequence between a caller process 430, a connection server 410, an ACD server 400 and an agent process 430, over networks 440. Specifically, the packet sequence illustrated in FIG. 4 illustrates the initialization process performed by ACD server 400 upon power on and testing. Following power on and testing of its architecture, ACD server 400 connects to a packet-switched data network 440 and transmits to connection server 410 an ONLINE packet for one of the departments, i.e. split groups which ACD server 400 is configured to represent, as illustrated by transmission 1. For example, transmission 1 may be the ONLINE packet for the sales department of a particular company having an E-mail address "sales @ company.com." In response, connection server 410 transmits and ONLINEACK packet to ACD server 400, as illustrated by transmission 2. ACD server 400 continues the above process for each department for which ACD server 400 is currently configured to represent. For example, transmissions 3 and 4 of FIG. 4 may represent the ONLINE packet and ONLINE acknowledge packets, respectively, for the support organization, having an E-mail address "support @ company.com."

Next, ACD server 400 processes Agent Information Table 330 from database 312 and creates entries at the connection server 410 for each WebPhone agent process having telephone privileges. This process is represented by transmission of a USERINFO packet, illustrated as transmission 5. The USERINFO packet contains the E-mail address of the respective agent, the agent name, etc. In response, connection server 410 transmits to ACD server 400 a USERINFO acknowledge packet, illustrated as transmission 6. Next, ACD server 400 transmits an ONLINE packet to connection erver 410, as illustrated by transmission 7 for the specific agent. In response, connection server 410 transmits an ONLINEACK packet to ACD server 400, as illustrated by transmission 8.

Once ACD 400 is online and has transmitted, an appropriate USERINFO packet for each agent to connection server 410, the respective agents 430 may log on to ACD server 400 as follows. An agent transmits an ONLINE packet to ACD server 400, as illustrated by transmission 9. In response, ACD server 400 transmits an ONLINEACK packet to agent 430, as illustrated by transmission 10. This process occurs for subsequent agents, as illustrated by transmissions 11 and 12. Agent 430 then transmits a LOGON packet to ACD server 400, as illustrated by transmission 13. In response, ACD server 400 transmits to agent 430 a LOGONACK packet, illustrated as transmission 14. The LOGON packet for an agent 430 may include the agent number and a password. Once the LOGONACK packet is received from ACD server 400, the agent is able to accept incoming calls. This process is continued for all agents 430 currently online, as illustrated by transmissions 15 and 16. For agents 530 already online at the time of initialization of ACD server 400, a PULSE packet (not shown) transmitted from agent 430 to ACD server 400 will achieve the same result as transmissions 9–16 of FIG. 4. A PULSE packet is described in the previously referenced copending applications.

Following the packet transmission sequence described with reference to FIG. 4, ACD server 400 is initialized with its respective connection server 410 and the respective agents 430 associated with ACD server 400 are similarly initialized and ready to receive calls.

Figure 5:
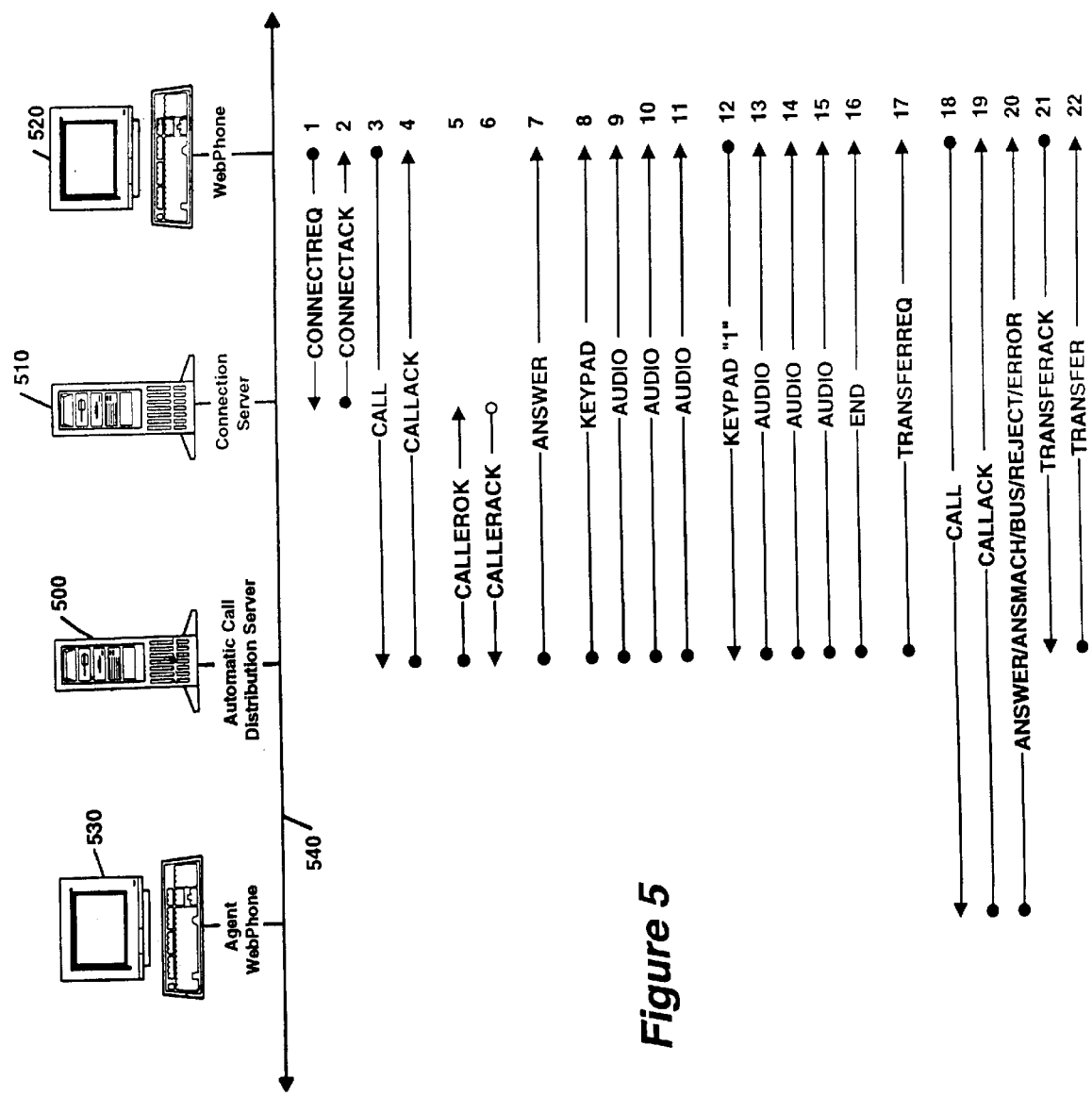
FIG. 5 is a schematic block diagrams illustrating a packet transfer sequence in accordance with the communication protocol of the present invention.

FIG. 5 illustrates schematically a packet transfer sequence between a caller process 520, a global server 510, an ACD server 500 and an agent process 530 over network 550. For the scenario illustrated by FIG. 5, it may be presumed that ACD server 500 has no voice mail functionality or any voice mail functionality, is disabled, and further, the split queue within the ACD server 300 is not full. First, caller process 520 transmits to connection server 510 a CONNECTREQ package, as illustrated by transmission 1. The format and content of all packets illustrated in FIG. 5 are described in detail in the previously referenced patent applications. In response, connection server 510 transmits a CONNECTACK packet to caller process 520, as illustrated by transmission 2. With this exchange of packets, the caller process 520 is able to obtain a reference to the appropriate group organization serviced by ACD server 500, such as "sales @ company.com" and is provided with the Internet Protocol address of the ACD server 500 by connection server 510. Next, caller process 520 transmits a CALL packet to ACD server 500, as illustrated by transmission 3, thereby initiating a call to the ACD server 500. In response, ACD server 500 transmits a CALLACK packet to caller process 520, as illustrated by transmission 4. Next, ACD server 500 verifies the validity of the caller process 520 by transmitting a CALLLEROK packet to connection server 510, as illustrated by transmission 5. In response, connection server 510 transmits a CALLERACK packet to ACD server 500, as illustrated by transmission 6, indicating that the caller process 520 is valid. The caller validation process and the utilization of the CALLEROK and CALLERACK packet is described in detail in U.S. patent application Ser. No. 08/719,894 entitled DIRECTORY SERVER FOR PROVIDING DYNAMICALLY ASSIGNED NETWORK PROTOCOL ADDRESSES with regard to FIG. 17A thereof.

Next, if the split queues within ACD server 500 are not full, ACD server 500 sends an ANSWER packet to caller process 500, as illustrated by transmission 7, and places the call on the "sales" queue for servicing by an agent 530.

While a caller process 520 is in queue, ACD server 500 enables the caller process keypad and may transmit periodic audio messages such as "Please wait for next available agent or press 1 to request a callback," and/or other information such as music, advertisements, stock quotes, etc. This process is illustrated in FIG. 5 by transmission of a KEYPAD packet from ACD server 500 to caller process 520, as illustrated by transmission 8. The subsequent audio message and/or audio sound track is illustrated by transmission of one or more AUDIO packets from ACD server 500 to caller process 520, as illustrated by transmissions 9–11. Although such messages are illustrated as transmissions of audio data, the information may conveyed as video, text, or multimedia data using the appropriate packet types and the WebPhone client software. If the caller presses "1" to request a callback, a KEYPAD "1" packet is transmitted from caller 520 to ACD server 500, as illustrated by transmission 12. In response, ACD server 500 may transmit one or more AUDIO packets to caller process 520 representing a message such as "Thank you for calling, a representative will return your call," as illustrated by transmissions 13–15 of FIG. 5. Finally, an END packet is transmitted from ACD server 500 to caller process 520, as illustrated by transmission 16, terminating the communication.

Alternatively, if an agent is available and the caller has not requested a callback, the call is transferred to an agent with the transmission of a TRANSFERREQ packet from ACD server 500 to caller 520, as illustrated by transmission packet 17. A CALL packet is then transmitted from caller 520 to agent 530, as illustrated by FIG. 18. Agent 530 then transmits a CALLACK packet to caller 520 as illustrated by transmission 19. Alternatively, if agent 530 is busy, any of the ANSWER, ANSWER MACHINE, BUSY, REJECT, or ERROR packets may be transmitted back to caller 520, as illustrated by transmission 20. In response, caller 520 transmits a TRANSFERACK packet to ACD server 500, as illustrated by transmission 21. ACD server 500 transmits a TRANSFER packet to caller 520, as illustrated by transmission 22, to facilitate transfer of the call to another agent process 530. Alternatively, if agent 530 was available to accept the call, transmission 19 would be followed by multiple AUDIO packets between agent 530 and caller 520, such packets containing the audio content of the communication between the parties. Such exchange of AUDIO packets as well as other types of packets including VIDEO, TEXT, etc. continues until either party transmits an END packet, similar to transmission 16.

Figure 6:
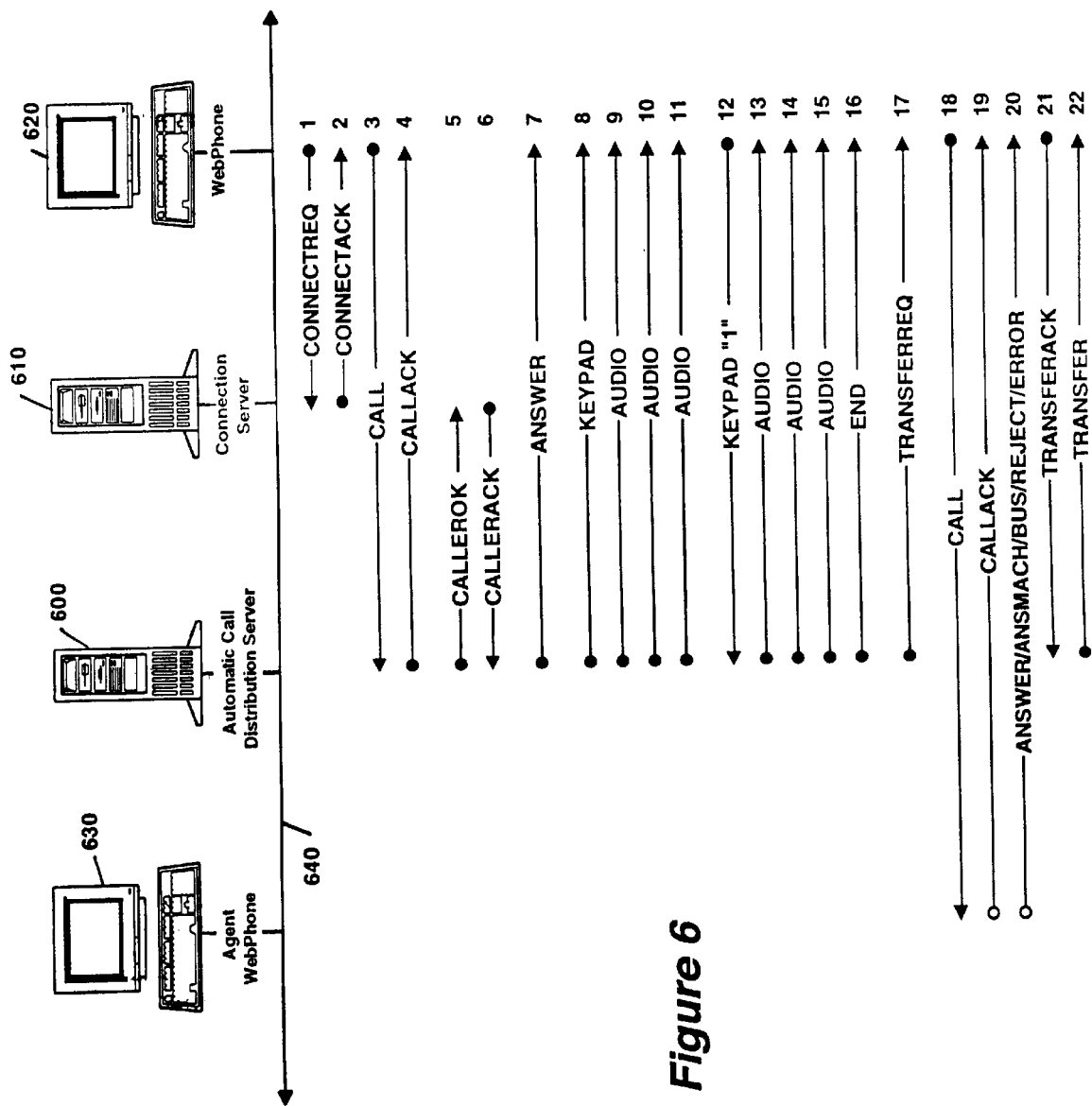
FIG. 6 is a schematic block diagrams illustrating a packet transfer sequence in accordance with the communication protocol of the present invention.

FIG. 6 illustrates the interaction between a caller 620, a global server 610, an ACD server 600, and an agent 630 interconnected over network 640, similar to the scenario described with reference to FIG. 5, with the exception that ACD server 600 has voice mail functionality which is enabled. Accordingly, transmissions 1–12 of FIG. 6 are identical to transmissions 1–12 of FIG. 5. In this scenario, since voice mail is enabled, the AUDIO packet transmitted from ACD server 600 to caller 620, as illustrated by transmission 13, may comprise a message such as "Please leave your message at the tone" or other audio queue. In response, caller 620 may transmit one or more AUDIO packets and an END packet, as illustrated by transmissions 14–16, of FIG. 6. Alternatively, ACD server 600 may transmit additional AUDIO packets representing a message such as "Thank you for calling, a representative will return your call," followed by a END packet, such transmissions not illustrated in FIG. 6. The remaining packet sequence illustrated by transmissions 17–22 of FIG. 6 is similar to that of FIG. 5 as well.

Figure 7:
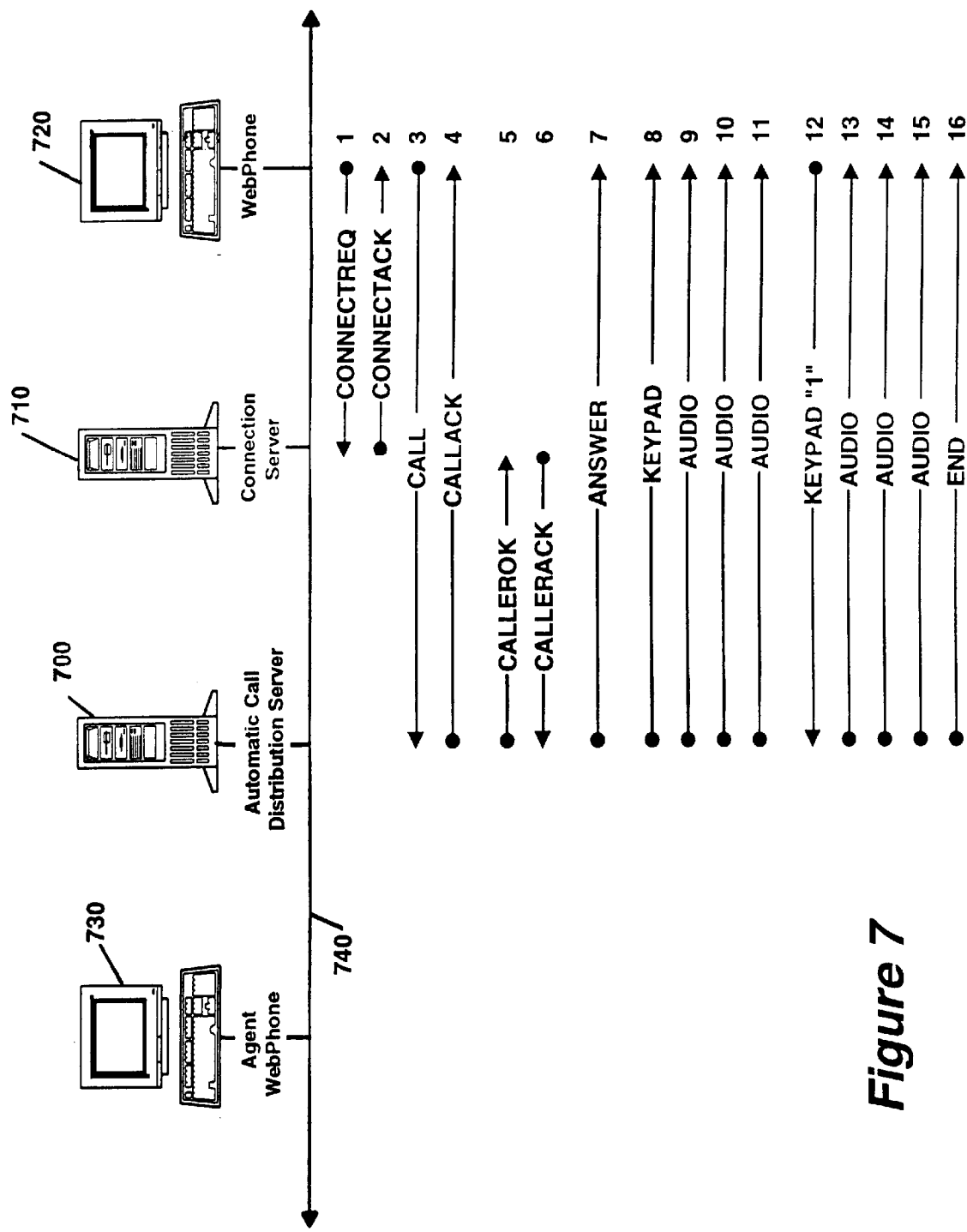
FIG. 7 is a schematic block diagrams illustrating a packet transfer sequence in accordance with the communication protocol of the present invention.

The packet transfer sequences illustrated in FIGS. 5 and 6 occur when agents are available to respond to calls from caller processes. If no agents are available, the packet transfer sequence between caller 720, connection server 710, ACD server 700 and agents 730 occurs, as illustrated in FIG. 7. In FIG. 7, transmissions 1–7 are identical to transmissions 1–7 of FIGS. 5 and 6, except that ACD server 700 does not place an incoming call into its respective queue. If ACD server 500 has voicemail disabled, a packet transfer sequence, illustrated by transmissions 8–16 of FIG. 7 will occur, similar to transmissions 8–16 of FIG. 5. Thereafter, however, since an agent is not available, transmission 17–22 which occurred with reference to FIG. 5, will not occur with reference to the scenario illustrated by FIG. 7.

FIG. 8 illustrates schematically the packet transfer sequence between a caller process 830, an ACD server 800, an agent process 830, and a second agent process 850 over network 840. For the scenario illustrated by FIG. 8, it is assumed that a call connection has been established between caller process 820 and agent process 830, the packet transfer sequence related to establishment of such a call not shown in light of FIGS. 4–7. The agent now wishes to conference a second agent, e.g. the supervisor, utilizing the conferencing functionality contained within the WebPhone client software versions 2.0 and thereafter. The first, agent process 830, transmits a CALL packet to agent process 850, i.e. the process to be conferenced, as illustrated by transmission 1. Agent process 850 then transmits a CALLACK packet to agent process 830, as illustrated by transmission 2, followed by an ANSWER packet, as illustrated by transmission 3. Agent process 830 then transmits a CONFADD packet, as described hereinafter, to agent process 850, as illustrated by transmission 4, and a CONFADD packet to caller process 820, as illustrated by transmission 5. The CONFADD packet transmitted to caller process 820 includes the Internet protocol address of agent process 850, while the CONFADD packet transmitted to agent process 850 contains the IP address of caller process 820. Each of agent process 850 and caller process 820 then transmit a CONFADDACK packet back to agent process 830 to acknowledge receipt of the conference information. At this point, any AUDIO, VIDEO and/or TEXT packets to be transmitted from a party in the conference will be transmitted to the other parties in the conference. The exchange of packets among the parties, illustrated as AUDIO packets for exemplary purposes only, is represented by transmissions 8–13. Finally, one of the parties to the conference transmits either an END packet or a CNFDROP packet, as illustrated by transmission 14, terminating the conference. Note that not all parties to a conference will be disconnected by transmission of this packet. Utilizing this packet sequence and the conferencing functionality in the WebPhone client product, more than one agent may participate in call processing to facilitate quality control, special problem handling, etc.

ACD Thread Processing

Figure 9:
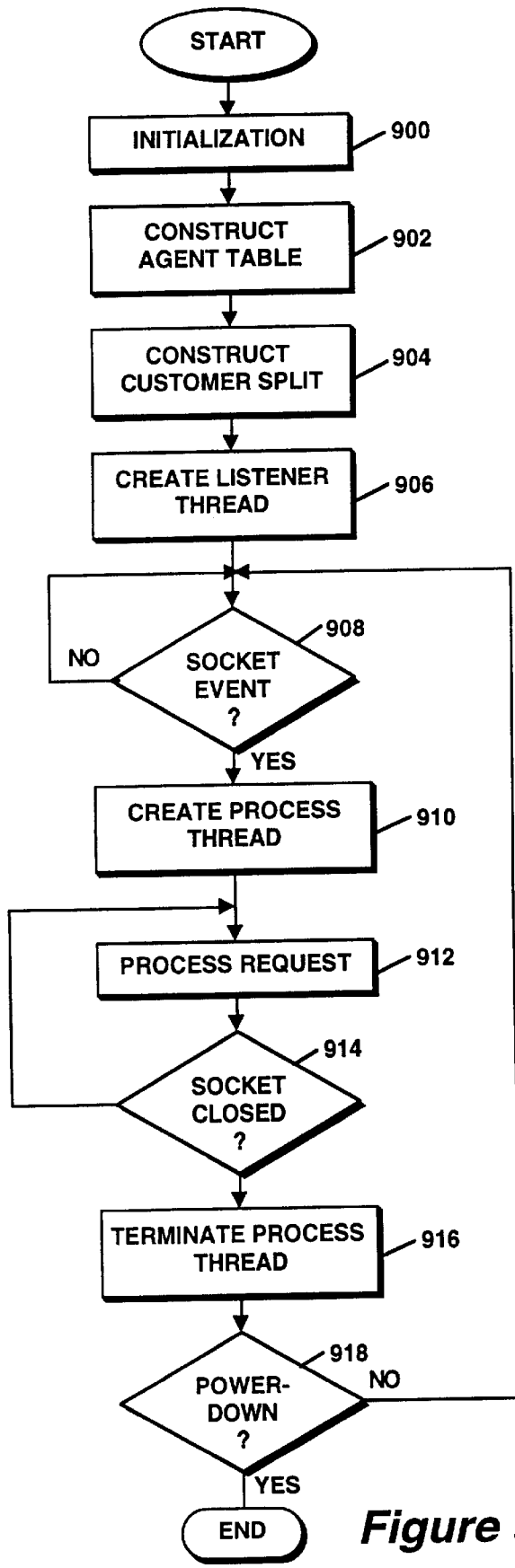
FIG. 9 is a flow chart illustrating the process steps performed by an initialization thread in accordance with the present invention.

Referring to FIG. 9, a flow chart illustrating the basic process step performed by an initialization thread executing within the ACD server 300 of the present invention is provided. The coding of the process steps of the flow chart of FIG. 9 into instructions or objects having analogous methods suitable for execution by the processor on which the invention is implemented will be understood by those having ordinary skill in the art of programming. Upon initialization of ACD server 300, a main thread performs initialization tasks similar to those described previously with reference to FIG. 4, as illustrated by procedural step 900. Next, an Agent Information Table 330 containing information about available agents is constructed in memory, as illustrated by procedural step 902. The agent table is constructed from information contained within database 312. Each entry of the Agent Information Table 330 includes information such as login, password, name, E-mail, split assignment, etc. The main thread next constructs an empty "customer split" structure, i.e. a priority queue, in accordance with a user specified queue depth and in accordance with a group split configuration as defined by the system supervisor, as illustrated by procedural step 904. The main thread then creates one or more listener threads to listen for socket connect events at the ACD_PORT and the CALL_PORT, as illustrated by procedural step 906. If a socket event is detected at either the ACD_PORT or CALL_PORT, as illustrated by decisional step 908, a process thread is created and dispatched to process the socket event, as illustrated by procedural steps 910 and 912. As described with reference to FIGS. 10-11, the process thread may comprise a control center, agent or customer thread. For example, if a socket event occurred from the control center, a control center thread is created and dispatched to process incoming requests from the ACD_PORT. Similarly, if a socket event occurred from an incoming caller, a customer thread is created and dispatched to process the customer events from the CALL_PORT.

Once a determination is made that the socket has closed, as illustrated by decisional step 914, the process thread created to service the request performs any final system maintenance tasks, and terminates, as illustrated by procedural step 916. The listener thread created in step 906 continues to listen to the appropriate port for new socket events.

Access to the Active Agent Table 340 and the Queue 360 is only allowed with the control of a semaphore to ensure that the information in such tables is not modified while one or more threads have access thereto.

Figure 10:
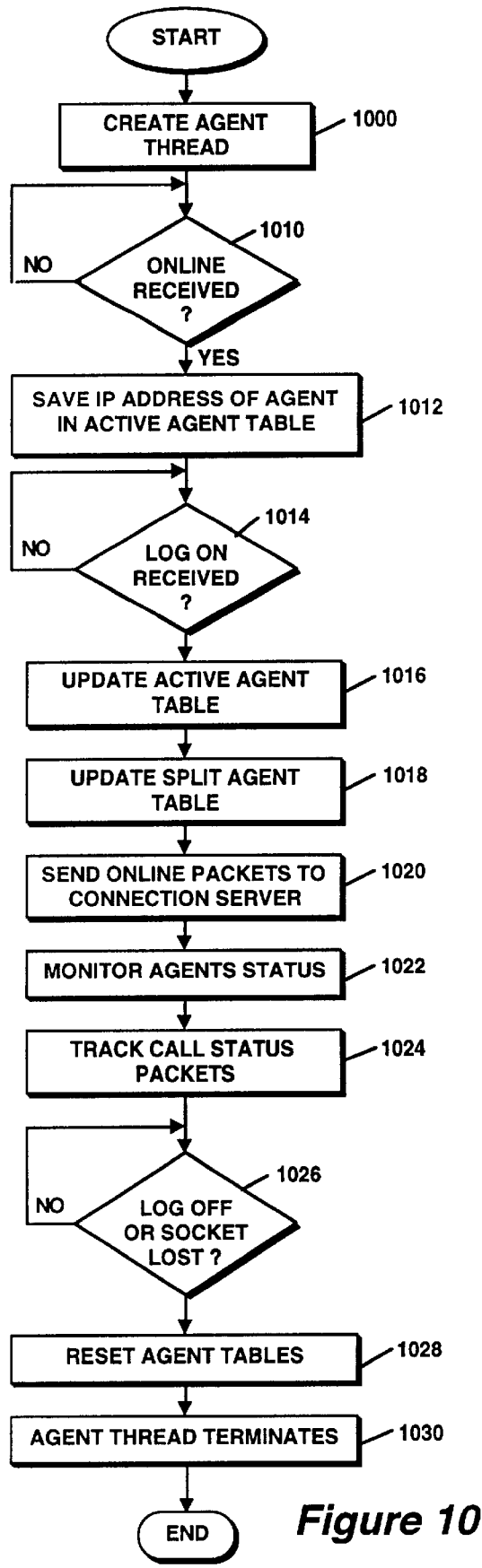
FIG. 10 is a flow chart illustrating the process steps performed by an initialization thread in accordance with the present invention.

Referring to FIG. 10, a flow chart illustrating the process steps in accordance with the present invention when the process thread control in procedural steps 910 and 912 is a control center or agent thread. The coding of the process steps of the illustrated flow chart in FIG. 10 into instructions suitable for control of the processor on which the invention is implemented or into objects having analogous methods for performing the same will be understood by one having ordinary skill in the art of programming. As described previously with reference to procedural step 910 of FIG. 9, a control center or agent thread may be created by a listener thread upon receipt of a socket event at the ACD_PORT. Specifically, an agent thread is created by listener thread, as illustrated by procedural step 1000. The agent thread waits for an ONLINE packet to be received at the socket, as illustrated by decisional step 1010. If the ONLINE packet is received, the agent thread saves the Internet Protocol address of the agent in the Active Agents Table 340, previously described, as illustrated by process step 1012. Next, the agent thread determines if a LOGON packet is received, as illustrated by decisional step 1014. If the LOGON packet is received, the agent entry in the Active Agent Table 340 is updated with a pointer to the agent entry from the Agent Information Table 330, as illustrated by procedural step 1016. Next, using the appropriate entry from the Agent Split Table 350, the thread determines the split to which the agent is assigned and places a pointer in the Active Agent Table 340 to the entry for the subject agent, as illustrated by procedural step 1018. Next, the agent thread send an ON LOINE packet to the connection server on behalf of the agent process, as illustrated by procedural step 1020. Next, the agent thread monitors the connection for status packets indicating the status of the agent, as illustrated by procedural step 1022. Specifically, in the illustrative embodiment, an agent may have the following states. An agent may transmit a "ready" status packet indicating that the agent can now be assigned to an Active Agent Table and can handle customer calls. The agent may transmit a "connected" status packet indicating that the agent actually made contact with a customer. The agent may transmit a "Non-ACD" status packet indicating that the agent has initiated a call and is unavailable to receive customer calls. A "Wrap-Up" packet indicates that the agent has completed a customer call and is currently completing follow-on tasks. Other status packets indicating the non-availability of an agent may be transmitted to indicate that the agent is not currently able to accept customer calls.

If the Agent Information Table 330 indicates that an agent is allowed to originate or terminate non-ACD calls, an ONLINE packet is transmitted to the connection server 252 by the ACD server 300 on behalf of the agent, as illustrated by procedural step 1022. The agent thread monitors, times and logs any instance where call status packets are received, as illustrated by procedural step 1024. If the agent thread determines that either a LOGOFF packet or an OFFLINE packet is received, or, if a socket event is received indicating that the connection was lost, as illustrated by decisional step 1026, the agent thread resets the relevant entry in the Active Agent Table 340, as illustrated by procedural step 1028, and performs any system maintenance before terminating, as illustrated by procedural step 1030.

Figure 11A:
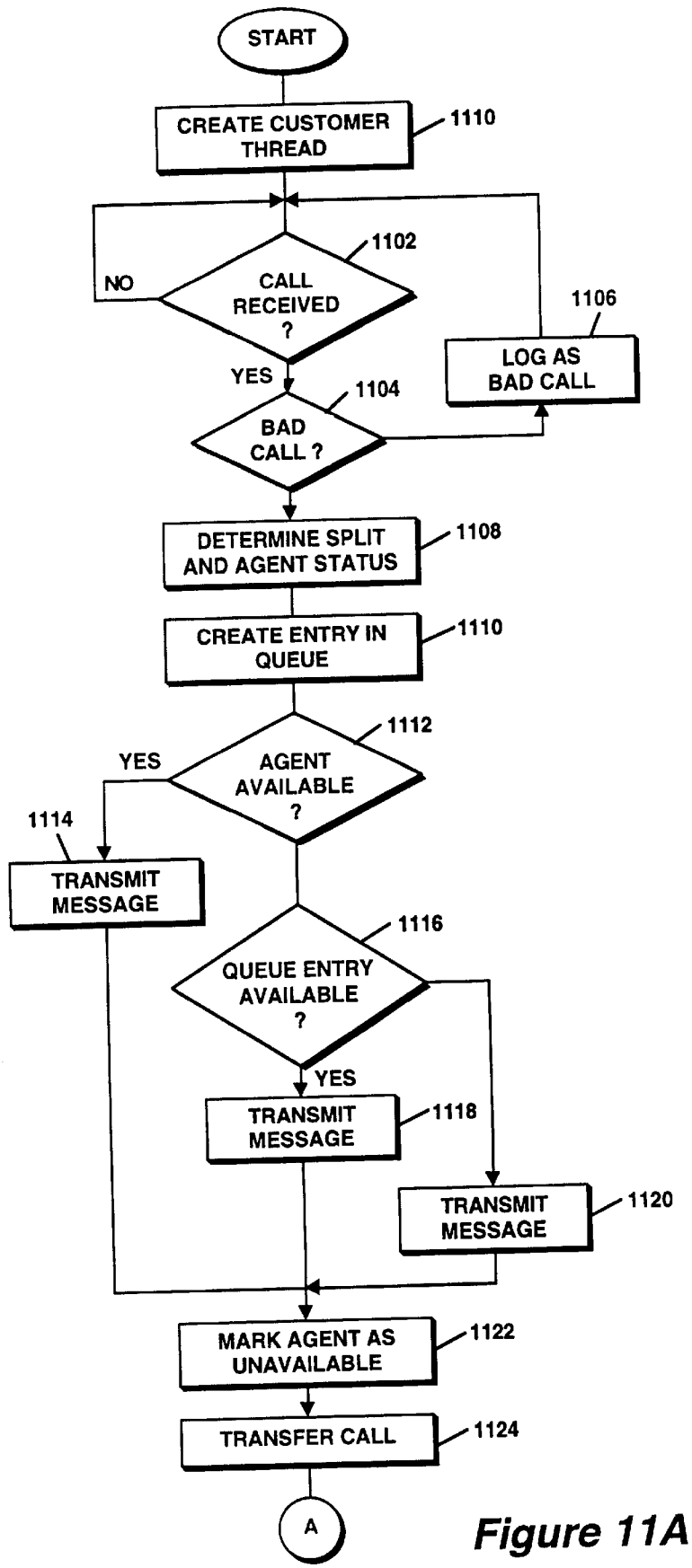
FIG. 11A and 11B form a flow chart illustrating the process steps performed by an initialization thread in accordance with the present invention.
Figure 11B:
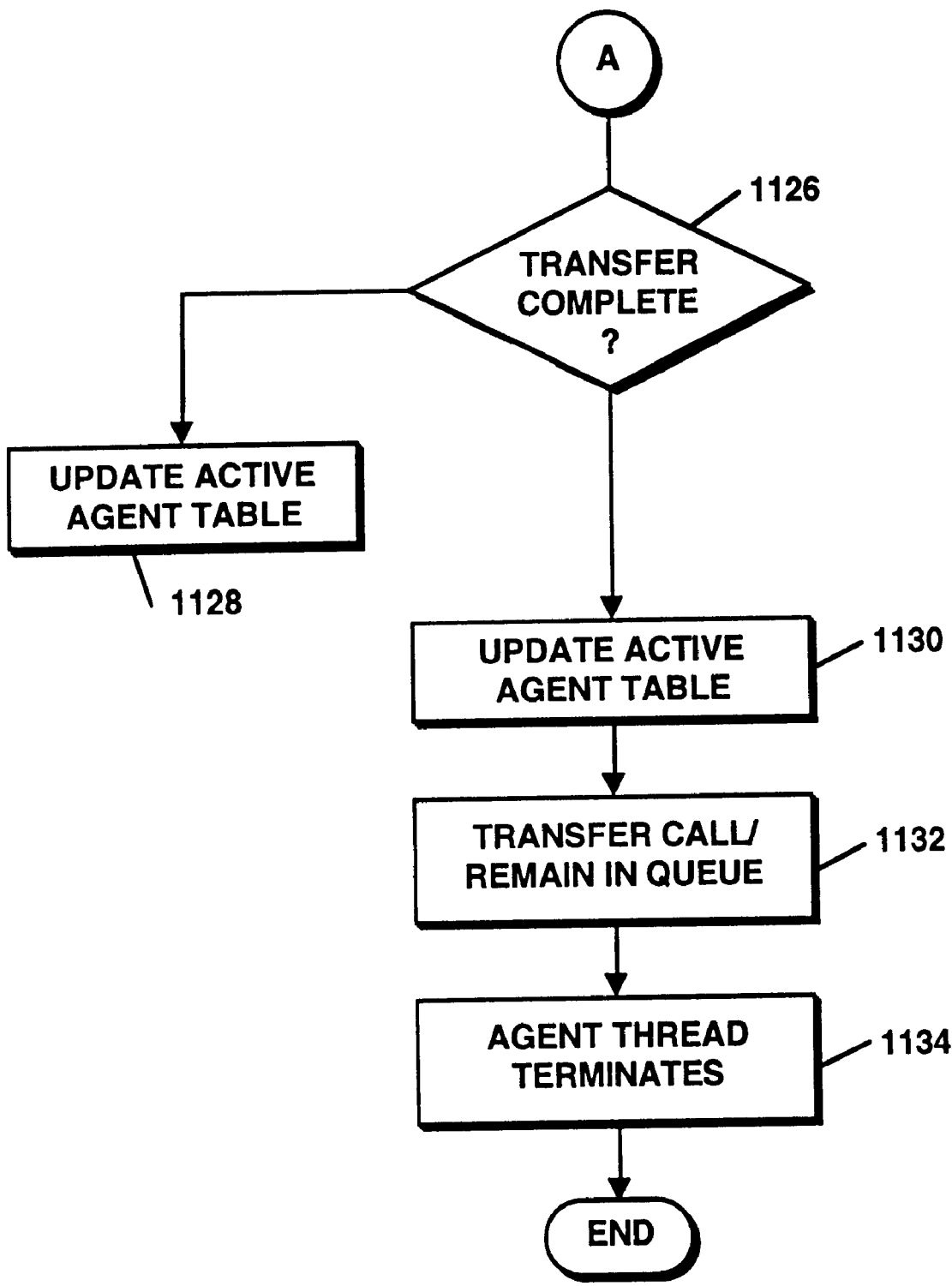

The process thread created in procedural step 910 of FIG. 9 may also be a customer thread, as described with reference to FIG. 11. Specifically, FIG. 11 is a flow chart illustrating the basic process steps performed by a customer thread in accordance with the present invention. The coding of the process steps illustrated in the flow chart of FIG. 11 into instructions or objects having analogous methods suitable to control the processor on which the invention is implemented will be understood by one having ordinary skill in the art of programming. Following creation of a "customer" thread, as illustrated by procedural step 1100, the customer thread determines whether a CALL packet has been received, as illustrated by decisional step 1102. If the call packet specifies a group or destination not configured to accept calls, the call is logged as a bad call, as illustrated by procedural step 1106. Otherwise, if the group is valid, the customer thread determines the split and agent status for the call, as illustrated by procedural step 1108. Next, the customer thread creates an entry in one of the split queues to log information about the call, as illustrated by procedural step 1110. If the customer thread determines that the split queue has agents available, the thread will transmit an "Agent available" message, as illustrated by decisional step 1112 and procedural step 1114. If the customer thread determines that there are no agents available, as illustrated by decisional step 1112, but that an entry is available in the split queue as illustrated by decisional step 1116, an "All agents are busy" message will be transmitted to the caller process, as illustrated by procedural step 1118. Alternatively, if no entries are available within the split queue, a "Try again later" message is transmitted to the caller process, as illustrated by procedural step 1120. If in decisional step 1112, an agent is available, or, when a queued call receives a "Next available agent" message, the customer thread marks the agent as unavailable, as illustrated by procedural step 1122, and attempts to transfer the call to an agent by transmission of a TRANSFERREQ packet from ACD server 300 to the agent, as illustrated by procedural step 1124. If the transfer request is successful, as determined in decisional step 1126, the customer thread marks the Active Agent Table 340 entry as having a "connected" status, as illustrated by procedural step 1128. Alternatively, if the transfer request was unsuccessful, the customer thread marks the entry within the Active Agent Table 340 to indicate that the agent is temporarily unavailable, as illustrated by procedural step 1130. As a result, ACD server 300 may, optionally, not attempt to transfer another call to the transferred agent until a predetermined time out period has expired, as defined by the ACD user/supervisor. If an agent is unavailable to accept a call, the customer thread attempts to recover the transfer by transferring the call to another agent with a similar TRANSFERREQ packet or, alternatively, leaving the customer in his/her current active queue position, as illustrated by procedural step 1132.

The transmitting of messages as described with reference to the processes illustrated in FIGS. 9–11 is achieved by transferring one or more AUDIO, VIDEO, or other data type packets as previously described with reference to FIGS. 4–8.

ADDITONAL ACD FUNCTIONS

ACD server 300 may be implemented to provide support for the following features:

Abandoned Call Tracking—Abandoned calls or hangups are not transferred from the queues to agents. However, call waiting time till hangup statistics may be kept. In addition, caller information is recorded allowing the ACD server 300 to route the hangups to agents for callback.

Alternate Night CCVs—Alternate call control vectoring based on night mode (see also Time of Day/Week CCV).

Management Defined Agent Availability Modes—Allows call center management to define Agent availability modes. Allows an Agent to report their station status as available to take calls, currently on a call, work mode, break, lunch, personal call, send a fax, sending diskettes, or other management defined status which is reconfigurable dynamically on a split by split basis.

Agent Personal Queues—Agents handling special topics, callers directed to reach a specific agent, emergency calls, supervisors needing to talk to a specific agent can be configured to call the agent specific queue. Agent specific queues are managed, configured and are identical to split queues.

Agent Logon/Log Off—Agent user information is not needed at the agent WebPhone client. Agents login/logout using an agent id and password. Agent information can be looked up by ACD server 300 and reflected up to connection server 252, if configured to do so by the supervisor. Reflecting this information up to connection server 252 allows the agent to receive and make calls, but allows ACD server 300 to perform call tracking and statistics reporting on these calls.

Agent Tally—The ACD allows agents to enter tally information if configured to do so. The Agent speed dials or uses a directory entry to reach a specific queue, and is prompted to enter the tally information through the Agent WebPhone keypad followed by the END key.

Agent Work Modes—The ACD allows the Agent to specify the progression of work modes in resolving customer calls. In most cases, only some additional paper work or updates to a customer record are necessary. In less frequent cases, the Agent may be required to perform further research or investigation to resolve a problem. These may be billed at different rates. The Agent may enter work mode 'one' when updating the customer data base, work mode 'two' when searching knowledge bases to investigating problems, work mode 'three' when its necessary to duplicate the customer environment, and actually debug a problem as in the case of software products.

Announcements—The ACD can be programmed to replay specific recordings at regular intervals, or greetings when a call is first received.

Assistance—Allows an Agent to request supervisor assistance. This may invoke the programming of the speed dial keys or the dragging of or double clicking on a directory entry for the supervisor queue or a specific supervisor. The supervisor can be privately consulted while the caller is on hold, conferenced in, or the caller transferred.

Automatic Call Recovery—Calls routed to an Agent WebPhone process and not answered within a configured amount of time or number of rings can be re-routed to another available agent.

Automatic Work Mode—Allows the supervisor to configure the ACD server 300 to automatically place the Agent in "available for calls status" after allowing a predetermined time to expire.

Bad Call Reporting—An Agent can report the call as a bad call or mis-routed call.

Break Modes—Allows the Agent to specify that they are unavailable to receive calls for various reasons as configured by the supervisor.

Call Control Vectoring (CCV) on Split Basis—Call Control Vectoring allows the user to configure their ACD to route calls to various queues or splits. Each split may be configured with its own call routing algorithms.

CCV based on Queue Depth—Support for CCV based on queue statistics. Queues reaching certain levels of activity or call hold time to Agent on duty ratios result in alternate CCV to other backup call centers, announcements, or backup/alternate agent strategies.

CCV based on Assigned Agent Priority—assigned to a particular split can be additionally assigned a priority that influences CCV. A collection of Agents assigned the same priority are routed calls equally. As split depths increase, lower priority agents from other splits, working at remote sites, working from home, etc. can be routed calls as needed to satisfy customer needs.

Call Distribution Methods—Configuration options allow the selection of call queuing models based on length of hold time, type of support required (complexity of subject matter, customers paid level of support, etc.)

Call Monitoring (Supervisor or Agent Initiated)—A supervisor may wish to monitor calls to appraise an Agent or insure quality of service. Additionally, supervisors may wish to participate or offer assistance to and Agent.

Call Transfer to Splits—Agents may transfer calls to other queues. Utilized when calls are mis-routed, customer requires attention from multiple agents, etc.

Call Waiting, Queue Depth, and Current Call Statistics—Agents are always aware of the current call load. Additionally, the stations can display the length of the current call, number of agents currently assigned, number of calls currently in the queue, longest call duration on in queue, etc.

Calling Party Identification (CLID, ANI, DNIS, etc.)—Agents receive indication of any of the available information about the incoming call. CLID—Caller ID, ANI—automatic number identification, DNIS—from the CO, or other information collected by voice response units.

Do Not Disturb (DND) and Category Support—Agents may indicate to the ACD that they are currently not available to accept calls for up to 10 supervisor configured classifications. The ACD keeps the statistics for later report generation. For example, Agents may log that restroom facilities are being utilized, on break, at lunch, originating a call to a customer, following up on previous calls requiring special attention, meeting with a supervisor, etc.

Hot Splits—CCV supports routing to Automatic Agents that collect user information or user requirements automatically or just make announcements.

InfoLinks—InfoLinks allow caller information (CLID, DNIS, ANI, etc.) to be passed to other Agent software applications. In addition, Agent WebPhones can utilize Dynamic Data Exchange or Object Linking and Embedding standards.

Language Support/Call Routing—CCV support for call routing based on language requirements.

Maximum Work Mode Time Limit—In automatic work mode, Agents that have not indicated that their work mode is complete can automatically be forced out of work mode, and assigned calls as needed.

Multi-Split Agents—The ACD allows Agents to be assigned to multiple queues by supervisors. In addition, Agents can be reassigned during special peak periods when queue depth reaches excessive levels. See also Queue Based CCV support.

Non-ACD Call Tracking—Support for tracking Agent calls (either business or personal in nature) can be tracked, logged and statistics reported. This applies to both Agent originated or terminated calls.

Priority Queuing—Calls transferred by an Agent to other Agents can receive priority queuing, avoiding being placed back at the beginning of a queue. Calls that have been mis-routed, or calls requiring interaction with multiple agents can be processed in this manner.

Split Features—Separate CCV on a split basis.

Stranded Call Routing—Calls left on the queue for excessive lengths of time can be automatically routed to receive announcements or special Agents.

Supervisor Queues—Support for multiple supervisor queues allowing Agents needing assistance access to the next available supervisor.

Time of Day and Week CCV—Alternate CCV based on the time of day or day of week to support automatic load balancing. A call center receiving calls after 5:00 pm EST could be route automatically to PST call centers.

ACD Packet Descriptions

The present invention contemplates a number of specialized packets to facilitate interaction between ACD server 300 and agent WebPhone processes 244 and control center 280, as described hereafter. The AGENT WEBPHONES STATUS CHANGE packet indicates a change in agent WebPhone call state. Through this packet, an agent can report their progress with call processing and indicate availability to accept additional calls. It is desirable that call progress messages and accompanying screens be configurable at ACD server 300 by the supervisor on a split basis, i.e. by call queue.

The AGENT WEBPHONE PARAMETER DOWNLOAD packet allows the ACD supervisor to control some of the configuration parameters of the Agent WebPhone processes, thereby allowing queue configuration changes to be reflected at the agent's desktop.

The LAUNCH packet may be transmitted from control center 280 to ACD server 300 or from control center 280 to connection server 242. When control center 280 is initiated, the LAUNCH packet is transmitted to ACD sever 300 and connection server 242 thereby creating a persistent socket connection to ACD server 300 and connection server 242. Control center 280 initially displays the unassigned tab, so the server(s) must supply current unassigned status and keep supplying unassigned events.

SHORT TERM STATISTICS Packet
(Control Center to ACD)

The SHORT TERM STATISTICS Packet may be transmitted from control center 350 to ACD server 300 300 to obtain information about usage over last few hours (# hours desired sent in initiating packet). Examples of this type if information follow:

Total Idle Time per Dept.

Total Processing Time per Dept.

Total DND Time per Dept.

Total Off-line Time per Dept.

CURRENT FULL STATUS Packet
(Control Center to ACD) (Control Center to CS)

Control Center will supply the department desired in the initiating packet. The server should immediately supply current status of the department being viewed and subsequently send all events that happen within this department until the Change View Packet is sent. In the case of the CS, the department is ALL Business s or the unassigned area. In the case of the ACD, the department is either truly a department or the unassigned users area.

CHANGE VIEW Packet
(Control Center to ACD) (Control Center to CS)

This packet will indicate that the Control Center User has changed departments. The server should stop sending event packets for the previous department and send a Full Status Packet for the new department. In the case of the CS, the department is ALL Business s or the unassigned area. In the case of the ACD, the department is either truly a department or the unassigned users area.

EVENT Packet (ACD to Control Center) (CS to Control Center)

This will indicate to the Client that one of the aforementioned events has occurred. The Control Center should update the GUI accordingly.

MOVE USER Packet
(Control Center to ACD) (Control Center to CS)

This packet is used when moving an Agent or Business from one area to another.

The user can be moved to/from all of the following:

Unassigned

Department

General BWP

The ACD/CS is then responsible for making appropriate table changes and subsequently routing calls accordingly.

REMOVE USER Packet
(Control Center to ACD) (Control Center to CS)

The REMOVE USER packet informs the control center 350 to ACD server 300 300 to remove a user from tables or other mechanism to ensure that the user cannot place calls or show up in directory assistance.

ADD DEPARTMENT Packet
Control Center to ACD)

Control Center will ask the ACD to create a new Department.

DELETE DEPARTMENT Packet
(Control Center to ACD)

Control Center will ask the ACD to remove a Department. All s assigned to that department that are not assigned to another department will be moved to the Unassigned areas.

REPORTING Packets
(Control Center to ACD) (Control Center to CS)

Control Center will ask ACD or CS for verbose statistics for printout. Examples of information requested follows:

Call statistics for department in time range

Call statistics for agent in time range

Max/Min call statistics reporting

A software implementation of the above-described embodiments may comprise a series of computer instructions either fixed on a tangible medium, such as a computer readable media, e.g. diskette 142, CD-ROM 147, ROM 115, or fixed disk 152 of FIG. 1A, or transmittable to a computer system, via a modem or other interface device, such as communications adapter 190 connected to the network 195 over a medium 191. Medium 191 can be either a tangible medium, including but not limited to optical or analog communications lines, or may be implemented with wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disk, or distributed from a server or electronic bulletin board over a network, e.g., the Internet or World Wide Web.

Although various exemplary embodiments of the invention have been disclosed, it will be apparent to those skilled in the art that various changes and modifications can be made which will achieve some of the advantages of the invention without departing from the spirit and scope of the invention. Further, many of the system components described herein such as the client application and the gateway have been described using products from NetSpeak Corporation. It will be obvious to those reasonably skilled in the art that other components performing the same functions may be suitably substituted. Further, the methods of the invention may be achieved in either all software implementations, using the appropriate processor instructions, or in hybrid implementations which utilize a combination of hardware logic and software logic to achieve the same results. Such modifications to the inventive concept are intended to be covered by the appended claims.

Call Packet

Packet Name: Call
Packet Type: WPP_CALL
Direction: WebPhone client to Conference Server
Description: Initiate a point to point call or a conference call.

| Structure: | Structure Name | Data Type | | Description |
|---|---|---|---|---|
| | Packet Type | unsigned char | 1 byte | WPP message identifier |
| | dwSession | unsigned long | 4 bytes | Session ID |
| | capability | unsigned short | 2 bytes | Version Capability |
| | protocol | unsigned short | 2 bytes | Version Protocol |
| | vendor | unsigned short | 2 bytes | Version Vendor |
| | nCodec | unsigned short | 2 bytes | Codec number |
| | szFirstName | char (10) | 10 bytes | first name |
| | szLastName | char (25) | 25 bytes | last name |
| | szAlias | char (20) | 20 bytes | alias |
| | szEmailAddr | char (90) | 90 bytes | EMail |
| | szIpAddr | char (80) | 80 bytes | IP |
| | szStreetAddr | char (50) | 50 bytes | street |
| | szApt | char (20) | 20 bytes | apt |
| | szCity | char (20) | 20 bytes | city |
| | szState | char (20) | 20 bytes | state |
| | szCountry | char (20) | 20 bytes | country |
| | szZipCode | char (20) | 20 bytes | zip code |
| | szPhone | char (25) | 25 bytes | phone number |
| | szFax | char (25) | 25 bytes | fax number |
| | szCompany | char (25) | 25 bytes | company name |
| | wTime | unsigned short | 2 bytes | current time |
| | cType | char (1) | 1 byte | caller type |
| | dwDecode Key | unsigned long | 4 bytes | decode key |
| | AUDIOCODECS[5] | AUDIOCODEC | 25 bytes | audio codec info |
| | dwFlag | unsigned long | 4 bytes | call flag | cType    0 - individual
        1 - company
dwFlag    1 - conference server preferred 0.1. CallAck Packet Packet Name: Caller Acknowledgment
Packet Type: WPP_CALLERACK
Direction: From the Connection Server
Description: Send Call OK verification.

| Structure: | Structure Name | Data Type | | Description |
|---|---|---|---|---|
| | Packet Type | unsigned char | 1 byte | WPP message identifier |
| | dwSession | unsigned long | 4 bytes | Session ID or conference ID |
| | capability | unsigned short | 2 bytes | Version Capability |
| | protocol | unsigned short | 2 bytes | Version Protocol |
| | vendor | unsigned short | 2 bytes | Version Vendor |
| | nCodec | unsigned short | 2 bytes | Codec number |
| | dwRemoteSession | unsigned long | 4 bytes | caller's session ID |
| | szFirstName | char (10) | 10 bytes | first name |
| | szLastName | char (10) | 25 bytes | last name |
| | szAlias | char (10) | 20 bytes | alias |
| | szEmailAddr | char (10) | 90 bytes | EMail |
| | szIpAddr | char (10) | 80 bytes | IP |
| | szStreetAddr | char (10) | 50 bytes | street |
| | szApt | char (10) | 20 bytes | apt |
| | szCity | char (10) | 20 bytes | city |
| | szState | char (10) | 20 bytes | state |
| | szCountry | char (10) | 20 bytes | country |
| | szZipCode | char (10) | 20 bytes | zip code |
| | szPhone | char (10) | 25 bytes | phone number |

-continued

| Structure: | Structure Name | Data Type | | Description |
|---|---|---|---|---|
| | szFax | char (10) | 25 bytes | fax number |
| | szCompany | char (10) | 25 bytes | company name |
| | wTime | unsigned short | 2 bytes | current time |
| | cType | char (1) | 1 bytes | caller type |
| | dwDecode Key | unsigned long | 4 bytes | decode key |
| | AUDIOCODECS[5] | AUDIOCODEC | 25 bytes | audio codec info |
| | dwFlag | unsigned long | 4 bytes | call flag |
| cType | | 0 - individual | | |
| | | 1 - company | | |
| dwFlag | | 1 - conference server preferred | | |

CnfAdd Packet

Packet Name: Conference party add
Packet Type: WPP_CONFADD
Direction: From to Conference Server
Description: Used to supply the conferencing server with the necessary information for this party to be added to a conference. A CALL packet should have preceded this packet with the dwFlag set to ADD PARTY.

| Structure: | Structure Name | Data Type | | Description |
|---|---|---|---|---|
| | Packet Type | unsigned char | 1 byte | WPP message identifier |
| | dwSession | unsigned long | 4 bytes | Session ID |
| | capability | unsigned short | 2 bytes | Version Capability |
| | protocol | unsigned short | 2 bytes | Version Protocol |
| | vendor | unsigned short | 2 bytes | Version Vendor |
| | szFirstName | char (10) | 10 bytes | first name |
| | szLastName | char (25) | 25 bytes | last name |
| | szAlias | char (20) | 20 bytes | alias |
| | szEmailAddr | char (90) | 90 bytes | Email |
| | dwIP | unsigned long | 4 bytes | IP address |
| | dwFirewallIP1 | unsigned long | 4 bytes | |
| | dwFirewallIP2 | unsigned long | 4 bytes | |
| | dwFirewallIP3 | unsigned long | 4 bytes | |
| | dwFirewallIP4 | unsigned long | 4 bytes | |
| | dwFirewallIP5 | unsigned long | 4 bytes | |
| | dwFirewallIP6 | unsigned long | 4 bytes | |
| | szStreetAddr | char (50) | 50 bytes | street |
| | szApt | char (20) | 20 bytes | apt |
| | szCity | char (20) | 20 bytes | city |
| | szState | char (20) | 20 bytes | state |
| | szCountry | char (20) | 20 bytes | country |
| | szZipCode | char (20) | 20 bytes | zip code |
| | szPhone | char (25) | 25 bytes | phone number |
| | szFax | char (25) | 25 bytes | fax number |
| | szCompany | char (25) | 25 bytes | company name |
| | wTime | unsigned short | 2 bytes | current time |
| | cType | char (1) | 1 byte | caller type |
| | dwEncode Key | unsigned long | 4 bytes | encode key |
| | dwDecode Key | unsigned long | 4 bytes | decode key |
| | AUDIOCODECS[5] | AUDIOCODEC | 25 bytes | audio codec info |
| | dwFlag | unsigned long | 4 bytes | Flag |
| | dwConfID | unsigned long | 4 bytes | Conference ID |
| | szConfPassword | char (10) | 10 bytes | Conference password |
| dwFlag | | 1 - create conference | | |
| | | 2 - create and add to conference | | |
| | | 4 - add to conference | | |

CnfAddAck Packet

Packet Name: Conference party add ACK
Packet Type: WPP_CONFADDACK
Direction: From Conference Server to WebPhone client Description:

| Structure: | Structure Name | Data Type | | Description |
|---|---|---|---|---|
| | Packet Type | unsigned char | 1 byte | WPP message identifier |
| | dwSession | unsigned long | 4 bytes | Conference ID |
| | capability | unsigned short | 2 bytes | Version Capability |
| | protocol | unsigned short | 2 bytes | Version Protocol |
| | vendor | unsigned short | 2 bytes | Version Vendor |
| | dwFlag | unsigned long | 4 bytes | Flag |
| | dwEncode Key | unsigned long | 4 bytes | encode key |
| | dwDecode Key | unsigned long | 4 bytes | decode key | dwFlag
1 - conference created
2 - added to conference
4 - request denied
8 - password required

CnfServerInfo Packet
Packet #: 0
Packet Name: Conference server information
Packet Type: WPP_CONFSRVINFO
Direction: From to
Description: Request information about the preferred conference server from the

| Structure: | Structure Name | Data Type | | Description |
|---|---|---|---|---|
| | Packet Type | unsigned char | 1 byte | WPP message identifier |
| | dwSession | unsigned long | 4 bytes | Session ID |
| | capability | unsigned short | 2 bytes | Version Capability |
| | protocol | unsigned short | 2 bytes | Version Protocol |
| | vendor | unsigned short | 2 bytes | Version Vendor |
| | dwFlag | unsigned long | 4 bytes | Flag |

CnfServerInfoAck Packet
Packet Name: Conference server information ACK.
Packet Type: WPP_CONFSRVINFOACK
Direction: From to
Description: Returned information about the preferred conference server from the

| Structure: | Structure Name | Data Type | | Description |
|---|---|---|---|---|
| | Packet Type | unsigned char | 1 byte | WPP message identifier |
| | dwSession | unsigned long | 4 bytes | Session ID |
| | capability | unsigned short | 2 bytes | Version Capability |
| | protocol | unsigned short | 2 bytes | Version Protocol |
| | vendor | unsigned short | 2 bytes | Version Vendor |
| | dwFlag | unsigned long | 4 bytes | Flag |
| | szEmailAddr | char (10) | 90 bytes | Conference server EMail |
| | szIpAddr | char (10) | 80 bytes | Conference server IP |
| | szPassword | char (10) | 10 bytes | Conference server password |
| | dwConnectionSpeed | unsigned long | 4 bytes | Connference server connection speed |
| | AUDIOCODECS[5] | AUDIOCODEC | 25 bytes | audio codec info |

CnfDrop Packet
Packet Name: Conference party drop
Packet Type: WPP_CONFDROP

Direction: From to Conference
Description: Used to indicate that a party is leaving a conference.

| Structure: | Structure Name | Data Type | | Description |
|---|---|---|---|---|
| | Packet Type | unsigned char | 1 byte | WPP message identifier |
| | dwSession | unsigned long | 4 bytes | Session ID |
| | capability | unsigned short | 2 bytes | Version Capability |
| | protocol | unsigned short | 2 bytes | Version Protocol |
| | vendor | unsigned short | 2 bytes | Version Vendor |

ConfParties Packet
Packet Name: Conference Parties Information
Packet Type: WPP_CONFPARTIES
Direction: From the Conferencing Server
Description: Send list of parties in conference in NULL terminated form(strings). The party data continues until all of the data required for the number of parties has arrived. This may mean multiple packets. The party data is as follows. The given lengths are maximums with character strings sent NULL terminated.

| Structure: | Structure Name | Data Type | | Description |
|---|---|---|---|---|
| | Packet Type | unsigned char | 1 byte | WPP message identifier |
| | dwSession | unsigned long | 4 bytes | Session ID |
| | capability | unsigned short | 2 bytes | Version Capability |
| | protocol | unsigned short | 2 bytes | Version Protocol |
| | vendor | unsigned short | 2 bytes | Version Vendor |
| | dwFlag | unsigned long | 4 bytes | Flag 1 - Add 2 - Drop |
| | nParties | unsigned short | 2 bytes | Number of parties |
| | wPartyDataLength | unsigned short | 2 bytes | Party data length in bytes |
| | PartyData | BYTE | ... | Party data |
| | dwRemoteSession | unsigned long | 4 bytes | caller's session ID |
| | wTime | unsigned short | 2 bytes | current time |
| | dwDecode Key | unsigned long | 4 bytes | decode key |
| | cType | char (1) | 1 bytes | caller type |
| | szFirstName | char (10) | 10 bytes | first name |
| | szLastName | char (10) | 25 bytes | last name |
| | szAlias | char (10) | 20 bytes | alias |
| | szEmailAddr | char (10) | 90 bytes | EMail |
| | szIpAddr | char (10) | 80 bytes | IP |
| | szStreetAddr | char (10) | 50 bytes | street |
| | szApt | char (10) | 20 bytes | apt |
| | szCity | char (10) | 20 bytes | city |
| | szState | char (10) | 20 bytes | state |
| | szCountry | char (10) | 20 bytes | country |
| | szZipCode | char (10) | 20 bytes | zip code |
| | szPhone | char (10) | 25 bytes | phone number |
| | szFax | char (10) | 25 bytes | fax number |
| | szCompany | char (10) | 25 bytes | company name |

Transfer Packet
Packet Name: Call Transfer.
Packet Type: WPP_TRANSFER
Direction: From to Description: Transfer current call to new party.

| Structure: | Structure Name | Data Type | | Description |
|---|---|---|---|---|
| | Packet Type | unsigned char | 1 byte | WPP message identifier |
| | dwSession | unsigned long | 4 bytes | Session ID |
| | capability | unsigned short | 2 bytes | Version Capability |
| | protocol | unsigned short | 2 bytes | Version Protocol |
| | vendor | unsigned short | 2 bytes | Version Vendor |
| | szEmailAddr | char (10) | 90 bytes | EMail |
| | szIpAddr | char (10) | 80 bytes | IP |
| | szFirstName | char (10) | 10 bytes | first name |
| | szLastName | char (10) | 25 bytes | last name |
| | szAlias | char (10) | 20 bytes | alias |
| | dwConfID | unsigned long | 4 bytes | Conference ID |
| | szConfPassword | char (10) | 10 bytes | Conference password |
| | dwFlag | unsigned long | 4 bytes | transfer flag | dwFlag
    1 - Add to Conference
    2 - Return to me if no answer
    4 - Return to me if answer machine

What is claimed is:

1. In an automatic call distribution system, a method of distributing incoming communications over a packet-switched data network, the method comprising the steps of:

A. determining the online status of at least one agent process;

B. defining at least one queue into which incoming communications over the packet-switched network may be placed, each incoming communication containing user information identifying the process from which the communication originated;

C. selectively associating agent processes with the queue in accordance with predetermined criteria;

D. selectively assigning incoming communications to one of the queues in accordance with predetermined criteria;

E. selectively transferring an incoming communication from a queue to one of the agent processes associated with the queue.

2. A computer program product for use with a computer system, the computer system operatively coupled to a computer network and capable of communicating with one or more processes over the network, the computer program product comprising a computer usable medium having program code embodied in the medium for distributing communications to one or more agent processes, the program code comprising:

A. program code means configured to determine the presence of at least one agent process operatively coupled to the computer system;

B. program code for defining within the computer system memory a queue, the queue having a plurality of entries, each capable of retaining information associated with an incoming communication;

C. program code, responsive to the agent processes currently online for enabling association of agent processes with the queue in accordance with a predetermined criteria;

D. program code, responsive to incoming communications to the computer system for selectively associating an incoming communication with the queue in memory; and E. program code, responsive to the incoming communications retained in queue and the association of agent processes with the queue, for selectively transferring an incoming communication to an agent process associated with the queue in which the incoming communication user information resides.

3. An automatic call distribution system for use with a packet-switched data network comprising:

A. a plurality of agent processes operatively coupled to the network

B. an automatic call distribution server operatively coupled to the network, the automatic call distribution server maintaining in a memory thereof a list containing information associated with selected of the agent processes and a list containing information associated with incoming communications; and C. a control center process operatively coupled to the automatic call distribution server, the control center process further comprising a graphic user interface for visually displaying and modifying the information within lists maintained in the automatic call distribution server memory.

* * * * *